US010020975B2

(12) United States Patent
Noh et al.

(10) Patent No.: US 10,020,975 B2
(45) Date of Patent: Jul. 10, 2018

(54) METHOD AND APPARATUS FOR DEMODULATING SIGNAL IN WIRELESS ACCESS SYSTEM

(71) Applicant: LG Electronics, Inc., Seoul (KR)

(72) Inventors: Kwangseok Noh, Seoul (KR); Jaehoon Chung, Seoul (KR); Genebeck Hahn, Seoul (KR); Eunjong Lee, Seoul (KR); Jinmin Kim, Seoul (KR); Kukheon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/500,733

(22) PCT Filed: Aug. 18, 2015

(86) PCT No.: PCT/KR2015/008620
§ 371 (c)(1),
(2) Date: Jan. 31, 2017

(87) PCT Pub. No.: WO2016/028063
PCT Pub. Date: Feb. 25, 2016

(65) Prior Publication Data
US 2017/0222860 A1    Aug. 3, 2017

Related U.S. Application Data

(60) Provisional application No. 62/038,796, filed on Aug. 18, 2014.

(51) Int. Cl.
*H03K 9/00* (2006.01)
*H04L 27/38* (2006.01)
(Continued)

(52) U.S. Cl.
CPC ............ *H04L 27/38* (2013.01); *H04B 7/0413* (2013.01); *H04L 27/06* (2013.01); *H04L 27/3845* (2013.01)

(58) Field of Classification Search
CPC ....... H04L 25/067; H04L 27/38; H04L 27/06; H04L 27/3845
(Continued)

(56) References Cited

U.S. PATENT DOCUMENTS

2014/0270014 A1* 9/2014 Xue .................. H04L 27/06
375/341

FOREIGN PATENT DOCUMENTS

KP    100548345 B1    2/2006
KR    100595584 B1    7/2006
(Continued)

OTHER PUBLICATIONS

Jonathan Duplicy, 'MU-MIMO in LTE Systems', EURASIP Journal on Wireless Communications and Networking, Mar. 8, 2011.

*Primary Examiner* — Leila Malek
(74) *Attorney, Agent, or Firm* — Dentons US LLP

(57) ABSTRACT

A method by which a terminal demodulates a signal in a wireless access system according to one embodiment of the present invention comprises the steps of: receiving a modulation signal having a modulation order of $2^m$ (m is a natural number); determining a first demodulation constellation arrangement corresponding to a $k^{th}$ (k is an even number among natural numbers of m or less) bit among m numbers of bits; determining a second demodulation constellation arrangement corresponding to an nth (n is an odd number among natural numbers of m or less) bit among the m numbers of bits; and demodulating the received modulation signal by using the first and second demodulation constellation arrangements, wherein the first constellation arrange-
(Continued)

ment can have a pattern in which a square matrix having a size of $2^{(m/2+1)-(k/2)}$ is repeated.

16 Claims, 20 Drawing Sheets

(51) Int. Cl.
*H04B 7/0413* (2017.01)
*H04L 27/06* (2006.01)

(58) Field of Classification Search
USPC .................................. 375/341, 262, 340, 316
See application file for complete search history.

(56) References Cited

FOREIGN PATENT DOCUMENTS

KR     1020100002100 A    1/2010
KR     1020100093498 A    8/2010

\* cited by examiner (a)

(b)

observation point

(a) region of second bit          (b) region of fourth bit (a) $M_1$ of first bit (b) $M_3$ of third bit (c) $M_5$ of fifth bit

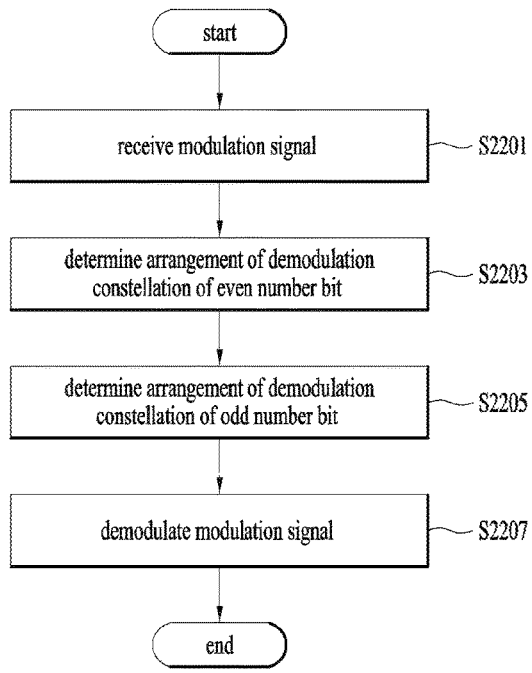
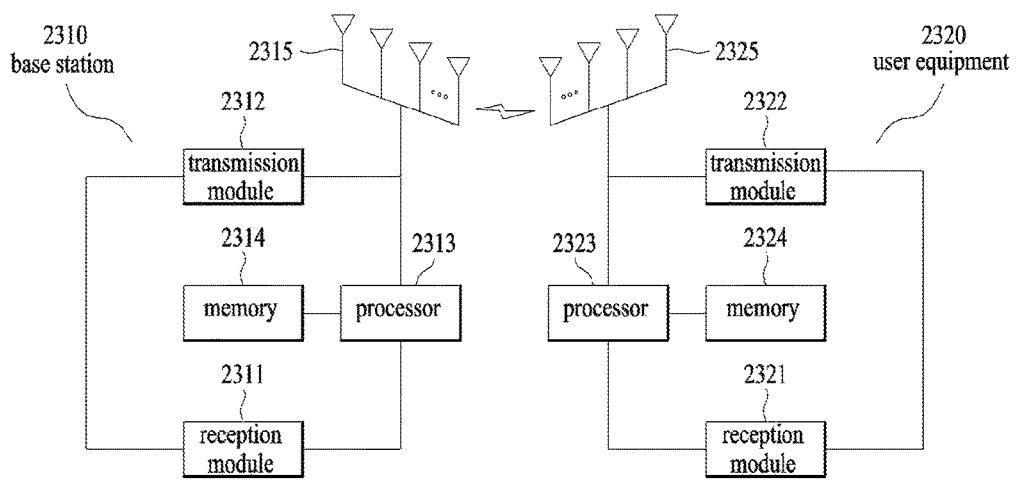

METHOD AND APPARATUS FOR DEMODULATING SIGNAL IN WIRELESS ACCESS SYSTEM

This application is a 35 USC § 371 National Stage entry of International Application No. PCT/KR2015/008620 filed on Aug. 18, 2015, and claims priority to U.S. Provisional Application No. 62/038,796 filed Aug. 18, 2014, all of which are hereby incorporated by reference in their entireties as if fully set forth herein.

TECHNICAL FIELD

The present invention relates to a wireless communication system, and more particularly, to a method of demodulating a modulated signal in a wireless access system using a modulation scheme and an apparatus supporting the same.

BACKGROUND ART

MIMO (multi-input multi-output) technology corresponds to a technology for increasing data transmission and reception efficiency using a plurality of transmission antennas and a plurality of reception antennas instead of using a single transmission antenna and a single reception antenna. If a single antenna is used, a receiving end receives data through a single antenna path. On the contrary, if multiple antennas are used, the receiving end receives data through several paths, thereby enhancing transmission speed and transmission capacity and increasing coverage.

A single-cell MIMO operation can be divided into a single user-MIMO (SU-MIMO) scheme that a single user equipment (UE) receives a downlink signal in a single cell and a multi user-MIMO (MU-MIMO) scheme that two or more UEs receive a downlink signal in a single cell.

Channel estimation corresponds to a procedure of restoring a received signal by compensating a distortion of the signal distorted by fading. In this case, the fading corresponds to a phenomenon of rapidly changing strength of a signal due to multi-path time delay in wireless communication system environment. In order to perform the channel estimation, it is necessary to have a reference signal known to both a transmitter and a receiver. The reference signal can be simply referred to as an RS (reference signal) or a pilot depending on a standard applied thereto.

A downlink reference signal corresponds to a pilot signal for coherently demodulating PDSCH (physical downlink shared channel), PCFICH (physical control format indicator channel), PHICH (physical hybrid indicator channel), PDCCH (physical downlink control channel) and the like. A downlink reference signal can be classified into a common reference signal (CRS) shared by all UEs within a cell and a dedicated reference signal (DRS) used for a specific UE only. Compared to a legacy communication system supporting 4 transmission antennas (e.g., a system according to LTE release 8 or 9 standard), a system including an extended antenna configuration (e.g., a system according to LTE-A standard supporting 8 transmission antennas) is considering DRS-based data demodulation to efficiently manage a reference signal and support an enhanced transmission scheme. In particular, in order to support data transmission through an extended antenna, it may be able to define a DRS for two or more layers. Since a DRS and data are precoded by a same precoder, it is able to easily estimate channel information, which is used for a receiving end to demodulate data, without separate precoding information.

DISCLOSURE OF THE INVENTION

Technical Task

In the following, the present invention intends to propose a method of demodulating a modulated signal in a wireless access system using a modulation scheme and an apparatus supporting the same based on the aforementioned discussion.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of demodulating a signal, which is demodulated by a user equipment in a wireless access system, includes the steps of receiving a modulation signal having a modulation order of $2^m$ (m is a natural number), determining arrangement of first demodulation constellation corresponding to a $k^{th}$ bit (k is an even number among natural numbers equal to or less than m) among m number of bits, determining arrangement of second demodulation constellation corresponding to an $n^{th}$ bit (n is an odd number among natural numbers equal to or less than m) among the m number of bits, and demodulating the received modulation signal using the first and second demodulation constellations. In this case, the first constellation arrangement may have a pattern that repeats a square matrix having a size of $2^{(m/2+1)-(k/2)}$.

The square matrix ($M_k$) may satisfy a following equation except a biggest even number bit among the natural numbers equal to or less than the m.

$$M_{k+2} = M_k \otimes \begin{bmatrix} 1 & 1 \\ 1 & 1 \end{bmatrix} \quad \text{[Equation A]}$$

The demodulating step can include the step of remapping the received modulation signal to bits except a biggest even number bit among the natural numbers equal to or less than the m among the $k^{th}$ bit using equation described in the following.

$$y'_I = y_I - [y_I/z] \times z$$

$$y'_Q = y_Q - [y_Q/z] \times z \quad \text{[Equation B]}$$

(where, $y_I$ corresponds to a real number part of the received modulation signal, $y'_I$ corresponds to a real number part of a remapped signal, $y_Q$ corresponds to an imaginary number part of the received modulation signal, $y'_Q$ corresponds to an imaginary number part of a remapped signal, and z corresponds to the size of the square matrix).

The demodulating step can include the step of determining a sign for bits except a biggest even number bit among the natural numbers equal to or less than the m among the $k^{th}$ bit using equation described in the following.

$$(-1)^{[y''_I(z/2)] + [y''_Q(z/2)]}, \quad \text{[Equation C]}$$

if $y_I$<0, the $y''_I = -y_I$ if $y_Q$<0, the $y''_Q = -y_Q$ (where, $y_I$ corresponds to a real number part of the received modulation signal, $y_Q$ corresponds to an imaginary number part of the received modulation signal, and z corresponds to the size of the square matrix).

The demodulating step can include the step of performing remapping on a biggest even number bit among the natural numbers equal to or less than the m among the $k^{th}$ bit using equation described in the following.

$$y'_I=|y_I|-\lceil |y_I|/z \rceil \times z$$

$$y'_Q=|y_Q|-\lceil |y_Q|/z \rceil \times z \quad \text{[Equation D]}$$

(where, $y_I$ corresponds to a real number part of the received modulation signal, $y'_I$ corresponds to a real number part of a remapped signal, $y_Q$ corresponds to an imaginary number part of the received modulation signal, $y'_Q$ corresponds to an imaginary number part of a remapped signal, and z corresponds to the size of the square matrix).

The demodulating step can include the step of determining a sign for a biggest even number bit among the natural numbers equal to or less than the m among the $k^{th}$ bit using equation described in the following.

$$(-1)^{\lceil (y_I+2^{m/2})/2 \rceil + \lceil (y_Q+2^{m/2})/2 \rceil + 1} \quad \text{[Equation E]}$$

(where, $y_I$ corresponds to a real number part of the received modulation signal and $y_Q$ corresponds to an imaginary number part of the received modulation signal).

The demodulating step can include the step of performing remapping on a biggest odd number bit among the natural numbers equal to or less than the m among the $n^{th}$ bit using equation described in the following.

$$y'_Q=|y_Q|-||y_Q|/z|\times z \quad \text{[Equation F]}$$

(where, $y_Q$ corresponds to an imaginary number part of the received modulation signal, $y'_Q$ corresponds to an imaginary number part of a remapped signal, and z corresponds to the size of the square matrix).

The demodulating step can include the step of determining a sign for a biggest odd number bit among the natural numbers equal to or less than the m among the $n^{th}$ bit using equation described in the following.

$$(-1)^{\lceil (y_Q+2^{m/2})/z \rceil} \quad \text{[Equation G]}$$

(where, $y_Q$ corresponds to an imaginary number part of the received modulation signal and z corresponds to the size of the square matrix).

To further achieve these and other advantages and in accordance with the purpose of the present invention, according to a different embodiment, a user equipment demodulating a signal in a wireless access system includes an RF (radio frequency) unit and a processor configured to receive a modulation signal having a modulation order of $2^m$ (m is a natural number), the processor configured to determine arrangement of first demodulation constellation corresponding to a $k^{th}$ bit (k is an even number among natural numbers equal to or less than m) among m number of bits, the processor configured to determine arrangement of second demodulation constellation corresponding to an $n^{th}$ bit (n is an odd number among natural numbers equal to or less than m) among the m number of bits, the processor configured to demodulate the received modulation signal using the first and second demodulation constellations. In this case, the first constellation arrangement may have a pattern that repeats a square matrix having a size of $2^{(m/2+1)-(k/2)}$.

The square matrix ($M_k$) may satisfy a following equation except a biggest even number bit among the natural numbers equal to or less than the m.

$$M_{k+2} = M_k \otimes \begin{bmatrix} 1 & 1 \\ 1 & 1 \end{bmatrix} \quad \text{[Equation A]}$$

The processor is configured to remap the received modulation signal to bits except a biggest even number bit among the natural numbers equal to or less than the m among the $k^{th}$ bit using equation described in the following.

$$y'_I=y_I-\lceil y_I/z \rceil \times z$$

$$y'_Q=y_Q-\lceil y_Q/z \rceil \times z \quad \text{[Equation B]}$$

(where, $y_I$ corresponds to a real number part of the received modulation signal, $y'_I$ corresponds to a real number part of a remapped signal, $y_Q$ corresponds to an imaginary number part of the received modulation signal, $y'_Q$ corresponds to an imaginary number part of a remapped signal, and z corresponds to the size of the square matrix).

The processor is configured to determine a sign for bits except a biggest even number bit among the natural numbers equal to or less than the m among the $k^{th}$ bit using equation described in the following.

$$(-1)^{\lceil y''_I/(z/2) \rceil + \lceil y''_Q/(z/2) \rceil}, \quad \text{[Equation C]}$$

if $y_I<0$, the $y''_I=-y_I$
if $y_Q<0$, the $y''_Q=-y_Q$ (where, $y_I$ corresponds to a real number part of the received modulation signal, $y_Q$ corresponds to an imaginary number part of the received modulation signal, and z corresponds to the size of the square matrix).

The processor is configured to perform remapping on a biggest even number bit among the natural numbers equal to or less than the m among the $k^{th}$ bit using equation described in the following.

$$y'_I=|y_I|-\lceil |y_I|/z \rceil \times z$$

$$y'_Q=|y_Q|-\lceil |y_Q|/z \rceil \times z \quad \text{[Equation D]}$$

(where, $y_I$ corresponds to a real number part of the received modulation signal, $y'_I$ corresponds to a real number part of a remapped signal, $y_Q$ corresponds to an imaginary number part of the received modulation signal, $y'_Q$ corresponds to an imaginary number part of a remapped signal, and z corresponds to the size of the square matrix).

The processor is configured to determine a sign for a biggest even number bit among the natural numbers equal to or less than the m among the $k^{th}$ bit using equation described in the following.

$$(-1)^{\lceil (y_I+2^{m/2})/2 \rceil + \lceil (y_Q+2^{m/2})/2 \rceil + 1} \quad \text{[Equation E]}$$

(where, $y_I$ corresponds to a real number part of the received modulation signal and $y_Q$ corresponds to an imaginary number part of the received modulation signal).

The processor is configured to perform remapping on a biggest odd number bit among the natural numbers equal to or less than the m among the $n^{th}$ bit using equation described in the following.

$$y'_Q=|y_Q|-||y_Q|/z|\times z \quad \text{[Equation F]}$$

(where, $y_Q$ corresponds to an imaginary number part of the received modulation signal, $y'_Q$ corresponds to an imaginary number part of a remapped signal, and z corresponds to the size of the square matrix).

The processor is configured to determine a sign for a biggest odd number bit among the natural numbers equal to or less than the m among the $n^{th}$ bit using equation described in the following.

$$(-1)^{\lceil (y_Q + 2^{m/2})/z \rceil}$$ [Equation G]

(where, $y_Q$ corresponds to an imaginary number part of the received modulation signal and z corresponds to the size of the square matrix).

Advantageous Effects

According to embodiments of the present invention, it is able to provide a method of demodulating a modulated signal in a wireless access system using a modulation scheme and an apparatus supporting the same.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 18 is a diagram for regions of a second bit and a fourth bit among even number bits;

FIG. 22 is a flowchart for an example of embodiments of the present invention;

FIG. 23 is a diagram for a base station and a user equipment applicable to one embodiment of the present invention.

BEST MODE

Mode for Invention

Figure 1:
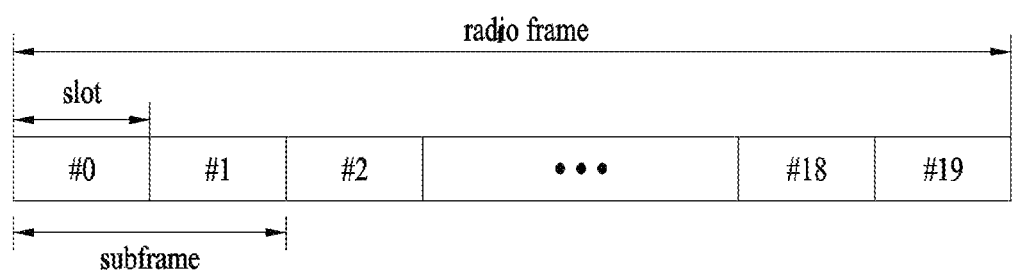
FIG. 1 is a diagram for a structure of a downlink radio frame.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1 illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

The aforementioned structure of a radio frame is just an example only. The number of subframes included in a radio frame, the number of slots included in a subframe, and the number of symbols included in a slot may be modified in various ways.

Figure 2:
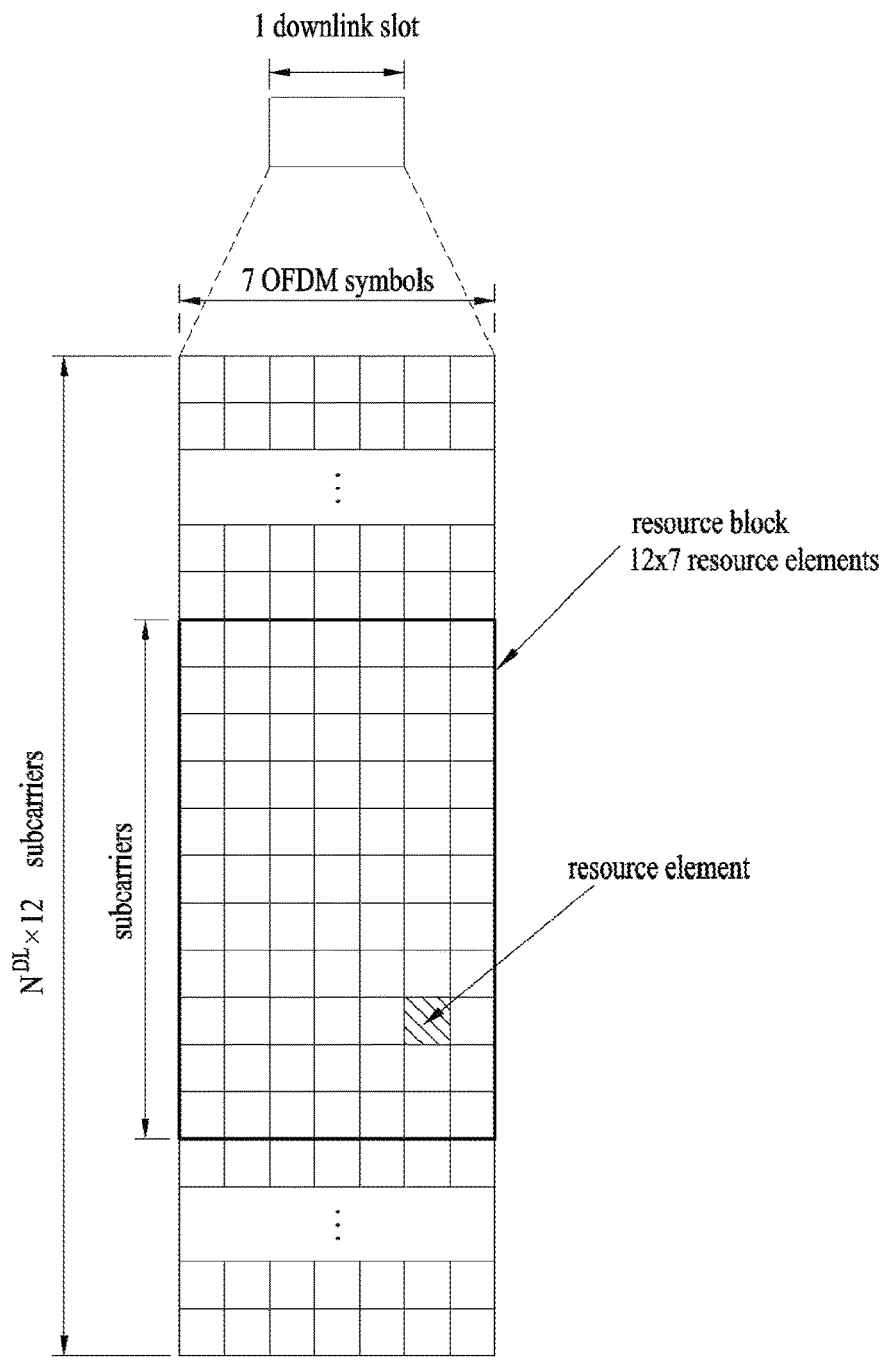
FIG. 2 is a diagram for an example of a resource grid of a downlink slot.

FIG. 2 is a diagram for an example of a resource grid of a downlink slot. FIG. 2 shows a case that an OFDM symbol is configured by a normal CP. Referring to FIG. 2, a downlink slot includes a plurality of OFDM symbols in a time domain and a plurality of resource blocks in a frequency domain. In this case, although FIG. 2 illustrates that a downlink slot includes seven OFDM symbols and a resource block includes twelve subcarriers, by which the present invention may be non-limited. Each element on the resource grid will be referred to as a resource element (RE). For example, an RE a (k, l) may correspond to an RE positioned at a $k^{th}$ subcarrier and an $l^{th}$ OFDM symbol. In case of a normal CP, one resource block includes 12*7 resource elements (in case of an extended CP, one resource block includes 12*6 resource elements). Since a space between subcarriers corresponds to 15 kHz, one resource block includes about 180 kHz in frequency domain. $N_{DL}$ corresponds to the number of resource blocks included in a downlink slot. A value of the $N_{DL}$ can be determined according to a downlink transmission bandwidth scheduled by a base station.

Figure 3:
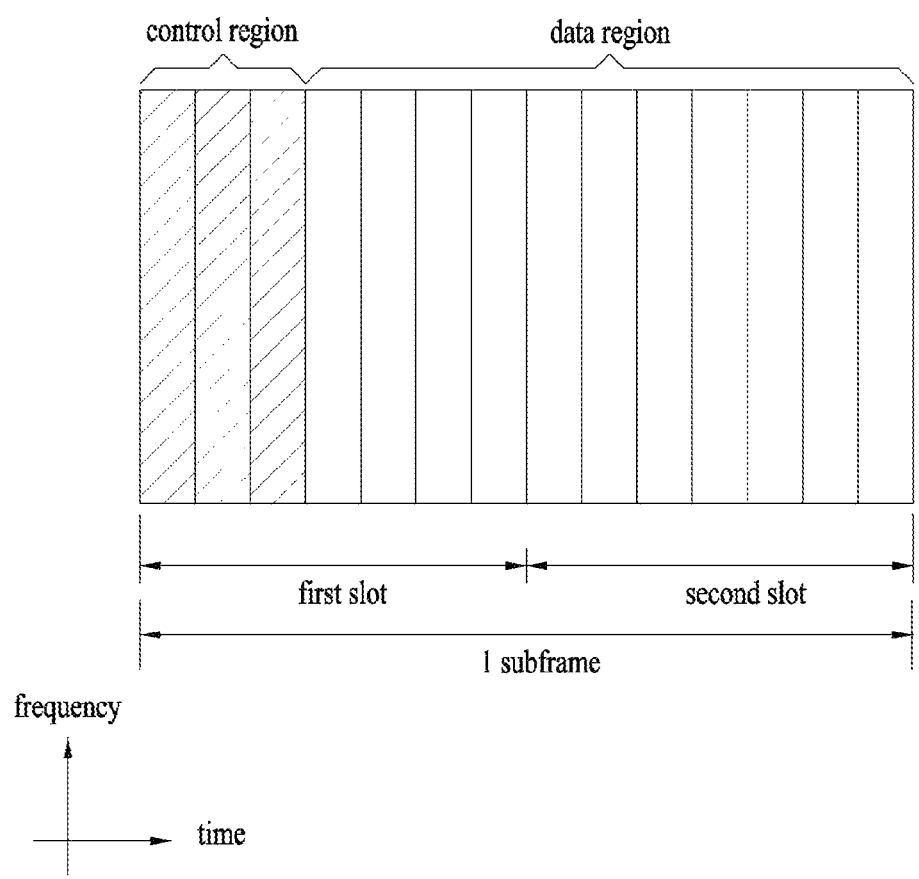
FIG. 3 is a diagram for structure of a downlink subframe.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
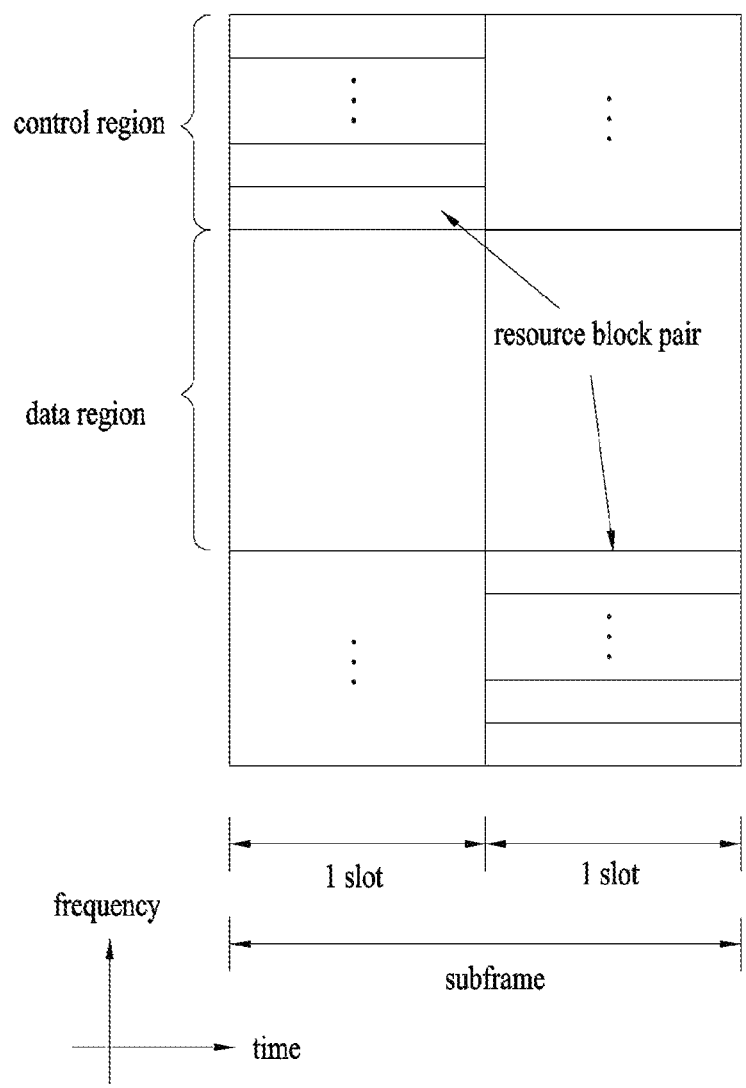
FIG. 4 is a diagram for structure of an uplink subframe.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

MIMO System Modeling

A MIMO system is a system for enhancing a data transfer rate using a plurality of transmission antennas and a plurality of reception antennas. A MIMO technology can receive the whole of data by aggregating a plurality of data fragments received through a plurality of antennas with each other without depending on a single antenna path to receive the whole of data.

The MIMO technology includes a spatial diversity scheme and a spatial multiplexing scheme. Since the spatial diversity scheme can increase transmission reliability and widen a cell radius through a diversity gain, the spatial diversity scheme is suitable for transmitting data to a fast moving user equipment. The spatial multiplexing scheme can increase a data transfer rate without increasing a system bandwidth by transmitting data different from each other at the same time.

Figure 5:
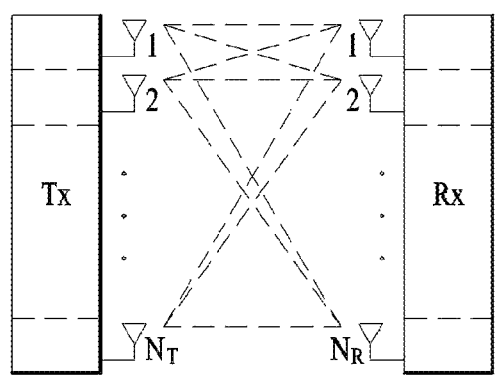
FIG. 5 is a diagram for a configuration of a wireless communication system including a plurality of antennas.
Figure 5:
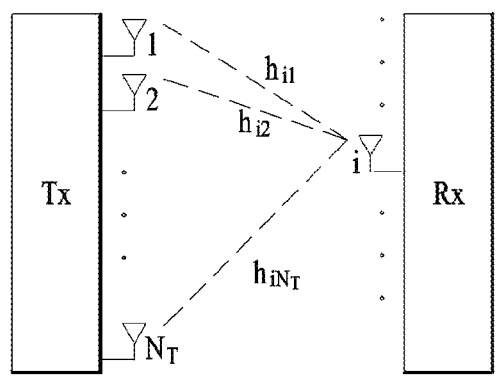

FIG. 5 is a diagram for a configuration of a wireless communication system including a plurality of antennas. As shown in FIG. 5 (a), if the number of transmission antennas and the number of reception antennas are increased to $N_T$ and $N_R$, respectively, unlike a case that a transmitter or a receiver uses a plurality of antennas only, theoretical channel transmission capacity increases in proportion to the number of antennas. Hence, it is able to considerably enhance transfer rate and frequency efficiency. If the channel transmission capacity increases, the transfer rate may theoretically increase as much as a maximum transfer rate (Ro) of a single antenna multiplied by a rate of increase (Ri).

For example, in a MIMO communication system using 4 transmission antennas and 4 reception antennas, it is able to theoretically obtain a transfer rate as fast as 4 times compared to a single antenna system. After the theoretical capacity increase of the multi-antenna system is proved in the mid-90s, various technologies for increasing data transfer rate using the theoretical capacity increase of the multi-antenna system have been discussed so far. Some of the technologies are already reflected to a standard of various wireless communications such as third generation mobile communication, next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

A communication method of the multi-antenna system is explained in more detail using mathematical modeling. Assume that there exist $N_T$ number of transmission antennas and $N_R$ number of reception antennas.

First of all, if we look into a transmission signal, the maximum number of information capable of being transmitted is $N_T$ when there are $N_T$ number of transmission antennas.

Meanwhile, a transmission signal x can be considered by a different method according to 2 cases (e.g., spatial diversity and spatial multiplexing). In case of the spatial multiplexing, since a different signal is multiplexed and the multiplexed signal is transmitted to a receiving end, an element of information vector(s) has a different value. Meanwhile, in case of the spatial diversity, since an identical signal is repeatedly transmitted through a plurality of channel paths, an element of information vector(s) has an identical value. Of course, it may also consider a combination of the spatial multiplexing and the spatial diversity. In particular, an identical signal is transmitted through a plurality of transmission antennas (e.g., 3) according to the spatial diversity scheme and other signals may be transmitted to a receiving end in a manner of being spatial multiplexed.

When modeling is performed on channels in multi-antenna wireless communication system, the channels can be classified according to an index of transmission/reception antenna. Assume that a channel passing through a transmission antenna j and a reception antenna i is represented as $h_{ij}$. In the $h_{ij}$, be cautious that an index of a reception antenna is first and an index of a transmission antenna is later.

FIG. 5 (b) shows channels between NT number of transmission antennas and a reception antenna i. The channels can be represented by a vector or a matrix in a manner of being bound.

AWGN (Additive White Gaussian Noise) is added to an actual channel after being underwent a channel matrix.

Since a rank of a matrix is defined by a minimum number of the numbers of row or column independent from each other, the rank of the matrix is configured not to be greater than the number of the row or the column.

In MIMO transmission, 'rank' corresponds to the number of paths capable of independently transmitting a signal and 'number of layers' corresponds to the number of signal streams transmitted via each path. In general, since a transmitting end transmits layers as many as the number of ranks used for transmitting a signal, a rank and the number of layers are used as a same meaning unless state otherwise.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

In a mobile communication system, a reference signal (RS) is mainly classified into two types according to the usage of the RS. One is an RS used for obtaining channel information and another is an RS used for demodulating data. Since the former one is used for a UE to obtain downlink channel information, it is necessary to be transmitted by a wide band. Although a UE does not receive downlink data in a specific subframe, the UE should be able to receive and measure the RS. The RS can also be used for measuring handover and the like. The latter one corresponds to an RS transmitted to a corresponding resource together with a downlink when a base station transmits the downlink. A UE can perform channel estimation by receiving the RS and may be then able to demodulate data. This RS should be transmitted to a region to which data is transmitted.

In legacy 3GPP LTE system (e.g., 3GPP LTE release-8), two kinds of downlink RSs are defined for a unicast service. In particular, one is a common RS (CRS) and another is a dedicated RS (DRS). The CRS is used for obtaining information on a channel status and measuring handover and the like. The CRS may also be referred to as a cell-specific RS. The DRS is used for demodulating data and may also be referred to as a UE-specific RS. In legacy 3GPP LTE system, the DRS is used for demodulating data only and the CRS is used for two purposes, i.e., channel information acquisition and data demodulation.

The CRS is a cell-specifically transmitted RS and is transmitted in every subframe for a wide band. The CRS can be transmitted for maximum 4 antenna ports according to the number of transmission antennas of a base station. For instance, if the number of transmission antennas of a base station corresponds to 2, a CRS for a $0^{th}$ antenna port and a CRS for a $1^{st}$ antenna port are transmitted. If the number of transmission antennas of a base station corresponds to 4, CRSs for 0 to $3^{rd}$ antenna port are transmitted, respectively.

Figure 6:
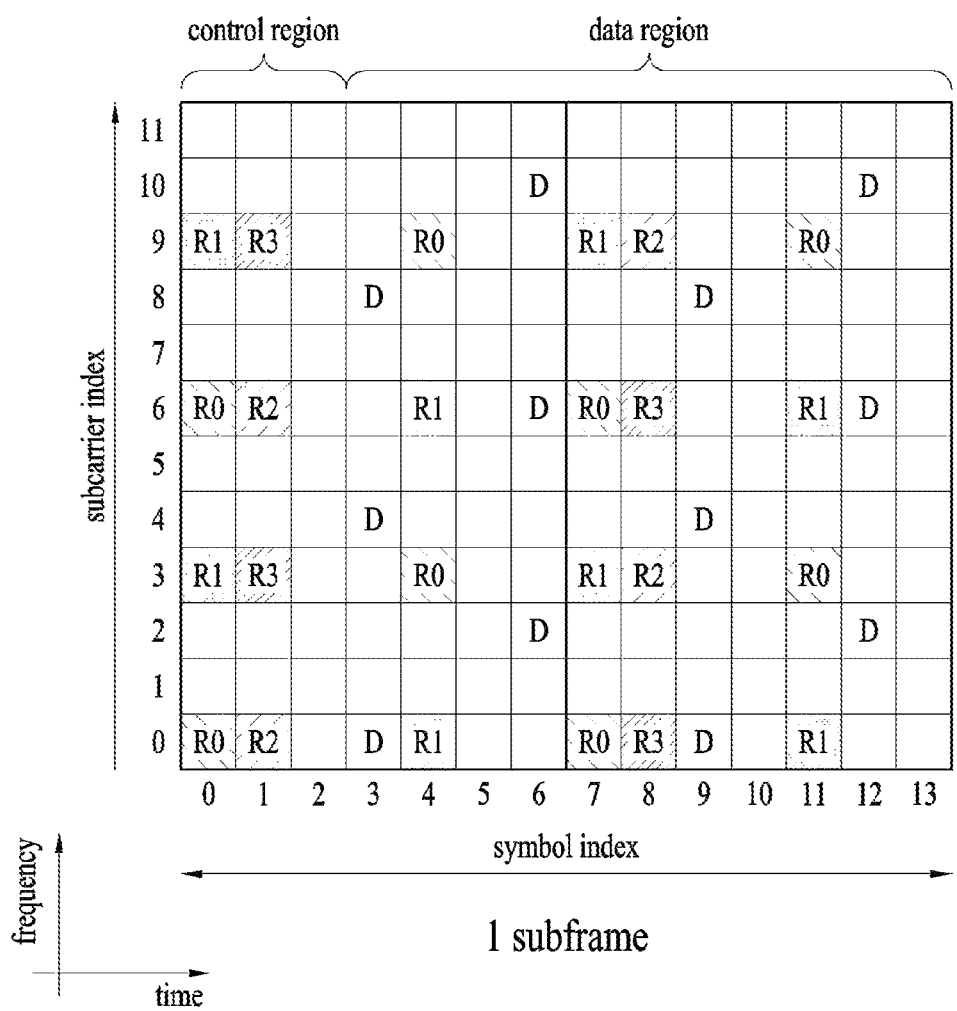
FIG. 6 is a diagram for a legacy pattern of a CRS and a DRS.

FIG. 6 shows a CRS pattern and a DRS pattern in a resource block (in case of a normal CP, 14 OFDM symbols in time axis and 12 subcarriers in frequency axis) of a system that a base station supports 4 transmission antennas. In FIG. 6, resource elements represented as 'R0', 'R1', 'R2' and 'R3' respectively indicate positions of CRSs for an antenna port index 0, 1, 2 and 3. Meanwhile, a resource element represented as 'D' in FIG. 6 indicates a position of a DRS defined in LTE system.

In LTE-A system corresponding to an evolved and advanced version of LTE system, it is able to support maximum 8 transmission antennas in downlink. Hence, RS for the maximum 8 transmission antennas should be supported as well. In LTE system, since a downlink RS is defined by RS for maximum 4 antenna ports only, if a base station includes the number of downlink transmission antennas greater than 4 and maximum 8 in LTE-A system, additional RS for the antenna ports should be defined. The RS for the maximum 8 transmission antenna ports should be designed to satisfy both the RS used for measuring a channel and the RS used for demodulating data.

In designing LTE-A system, one of important considerations is backward compatibility. The backward compatibility means to support a legacy LTE terminal to operate well in LTE-A system. In terms of RS transmission, if additional RS for the maximum 8 transmission antenna ports is added to time-frequency domain where a CRS defined in LTE standard is transmitted to whole band in every subframe, RS overhead becomes considerably big. Hence, in newly designing the RS for the maximum 8 antenna ports, it is necessary to consider reducing the RS overhead.

An RS newly introduced in LTE-A system can be classified into two types. One is an RS (CSI-RS (channel state information-RS)) used for measuring a channel to select MCS (modulation and coding scheme), PMI (precoding matrix index) and the like and another one is an RS (DM-RS (demodulation RS)) used for demodulating data transmitted by maximum 8 transmission antennas.

Unlike a CRS of a legacy LTE system, which is used not only for channel measurement, handover measurement and the like but also for data demodulation, the CSI-RS has a characteristic of being designed mainly for a channel measurement. Of course, the CSI-RS may also be used for measuring handover and the like. Since the CSI-RS is transmitted for the purpose of obtaining information on a channel status only, unlike the CRS of the legacy LTE system, it is not necessary to transmit the CSI-RS in every subframe. Hence, in order to reduce overhead of the CSI-RS, the CSI-RS can be designed to be intermittently (e.g., periodically) transmitted in a time axis.

If data is transmitted in a downlink subframe, a DM RS is dedicatedly transmitted to a UE to which data transmission is scheduled. A DM RS dedicated to a specific UE can be designed to be transmitted in a resource region in which the UE is scheduled, i.e., time-frequency domain to which data for the UE is transmitted only.

Figure 7:
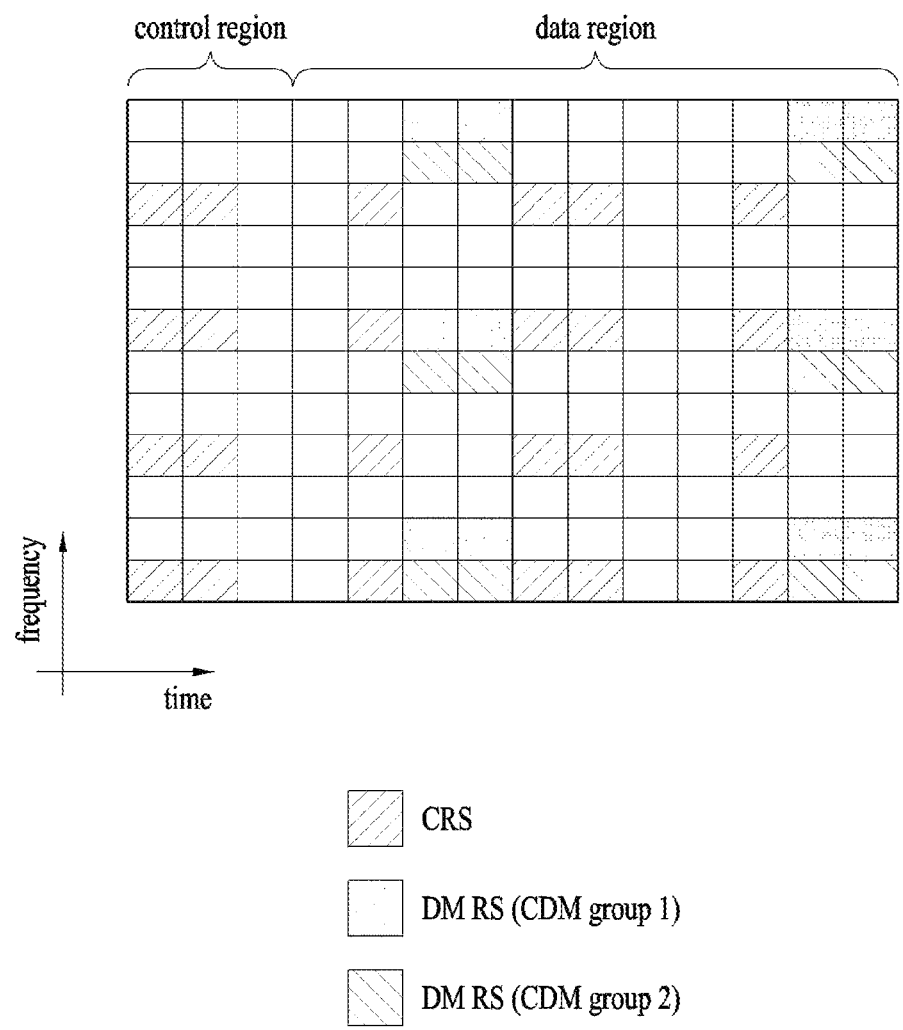
FIG. 7 is a diagram for an example of a DM RS pattern.

FIG. 7 is a diagram for an example of a DM RS pattern defined in LTE-A system. In FIG. 7, in case of one RB pair (in case of a normal CP, 14 OFDM symbols in a time domain×12 subcarriers in a frequency domain) used for DL data transmission, FIG. 7 shows the locations of resource elements (REs) used for DMRS transmission. DMRS may be transmitted to 4 antenna ports (antenna port indexes 7, 8, 9 and 10) additionally defined in the LTE-A system. DMRSs for different antenna ports are located at different frequency resources (subcarriers) and/or different time resources (OFDM symbols), such that each DMRS can be identified (That is, DMRSs may be multiplexed according to the FDM and/or TDM scheme(s)). In addition, DMRSs of different antenna ports located at the same time-frequency resources may be distinguished from each other by different orthogonal codes (that is, the DMRSs may be multiplexed according to the CDM scheme). In the example of FIG. 7, DMRSs for the antenna port 7 and 8 may be located at resource elements (REs) represented as a DMRS CDM group 1 and the DMRSs can be multiplexed by an orthogonal code. Similarly, in the example of FIG. 7, DMRSs for the antenna port 9 and 10 may be located at resource elements (REs) represented as a DMRS CDM group 2 and the DMRSs can be multiplexed by an orthogonal code.

Figure 8:
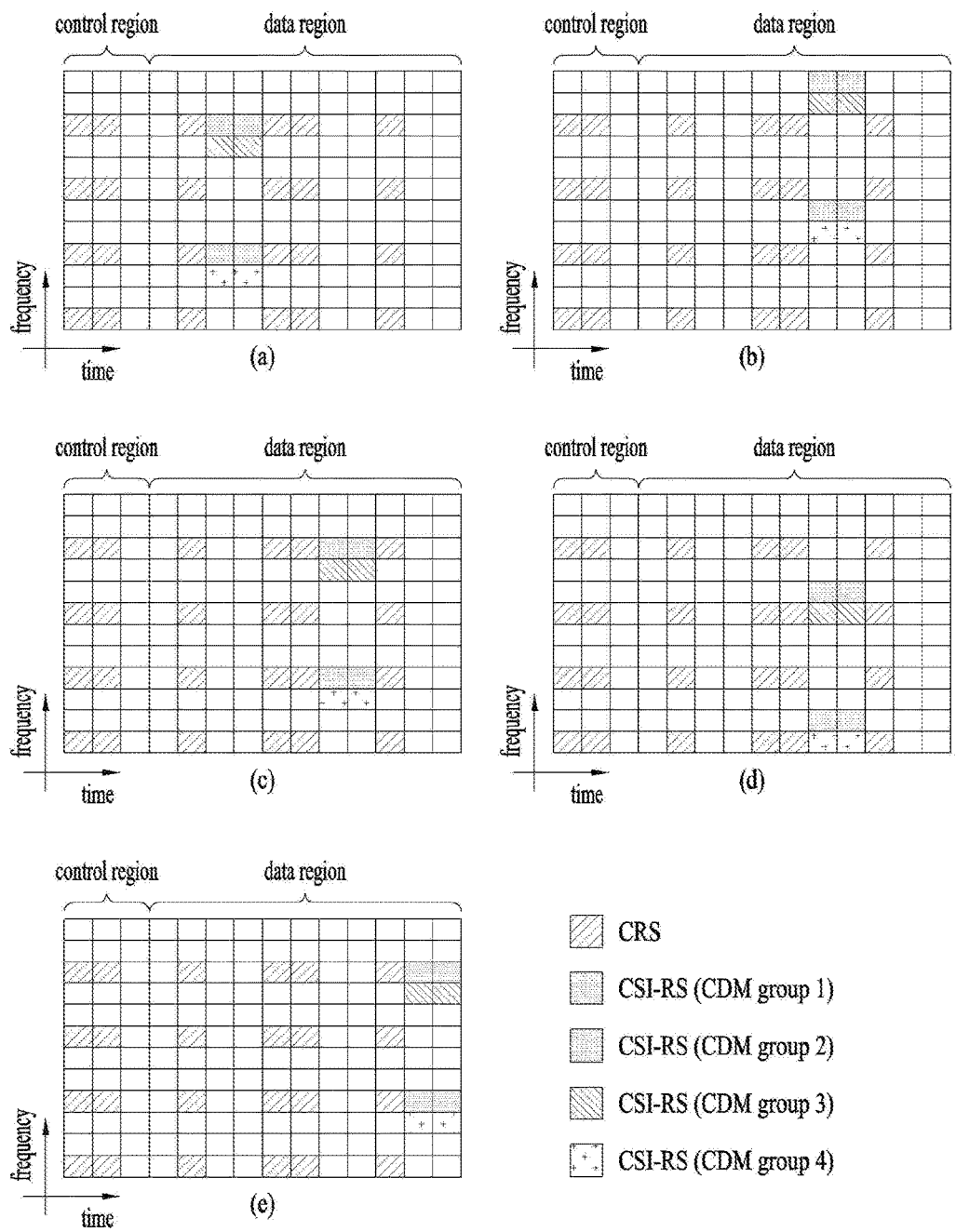
FIG. 8 is a diagram for examples of a CSI-RS pattern.

FIG. 8 is a diagram for examples of a CSI-RS pattern defined in LTE-A system. In FIG. 8, in case of one RB pair (in case of a normal CP, 14 OFDM symbols in a time domain×12 subcarriers in a frequency domain) used for DL data transmission, FIG. 8 shows the locations of resource elements (REs) used for CSI-RS transmission. One CSI-RS pattern shown in FIGS. 8(a) to 8(e) may be used in a certain DL subframe. CSI-RS may be transmitted to 8 antenna ports (antenna port indexes 15, 16, 17, 18, 19, 20, 21 and 22) additionally defined in the LTE-A system. CSI-RSs for different antenna ports are located at different frequency resources (subcarriers) and/or different time resources (OFDM symbols), such that each CSI-RS can be identified (That is, CSI-RSs may be multiplexed according to the FDM and/or TDM scheme(s)). In addition, CSI-RSs of different antenna ports located at the same time-frequency resources may be distinguished from each other by different orthogonal codes (that is, the CSI-RSs may be multiplexed according to the CDM scheme). As shown in FIG. 8(a), CSI-RSs for antenna ports 15 and 16 may be located at REs represented as a CSI-RS CDM Group 1, and may be multiplexed by an orthogonal code. As shown in FIG. 8(a), CSI-RSs for antenna ports 17 and 18 may be located at REs represented as a CSI-RS CDM Group 2, and may be multiplexed by an orthogonal code. As shown in FIG. 8(a), CSI-RSs for antenna ports 19 and 20 may be located at REs represented as a CSI-RS CDM Group 3, and may be multiplexed by an orthogonal code. As shown in FIG. 8(a), CSI-RSs for antenna ports 21 and 22 may be located at REs represented as a CSI-RS CDM Group 4, and may be multiplexed by an orthogonal code. The same principles described in FIG. 8(a) may be applied to FIGS. 8(b) to 8(e).

RS patterns shown in FIGS. 6 to 8 are disclosed only for illustrative purposes, and the scope or spirit of the present invention are not limited only to a specific RS pattern. That is, even in the case in which RS patterns different from those of FIGS. 6 to 8 are defined and used, various embodiments of the present invention can also be equally applied thereto without difficulty.

CSI-RS Configuration

Among a plurality of CSI-RSs and a plurality of IMRs set to a UE, one CSI process can be defined in a manner of associating a CSI-RS resource for measuring a signal with an interference measurement resource (IMR) for measuring interference. A UE feedbacks CSI information induced from CSI processes different from each other to a network (e.g., base station) with an independent period and a subframe offset.

In particular, each CSI process has an independent CSI feedback configuration. The base station can inform the UE of the CS-RS resource, the IMR resource association information and the CSI feedback configuration via higher layer signaling. For example, assume that three CSI processes shown in Table 1 are set to the UE.

TABLE 1

| CSI Process | Signal Measurement Resource (SMR) | IMR |
|---|---|---|
| CSI process 0 | CSI-RS 0 | IMR 0 |
| CSI process 1 | CSI-RS 1 | IMR 1 |
| CSI process 2 | CSI-RS 0 | IMR 2 |

In Table 1, a CSI-RS 0 and a CSI-RS 1 indicate a CSI-RS received from a cell 1 corresponding to a serving cell of a UE and a CSI-RS received from a cell 2 corresponding to a neighbor cell participating in cooperation, respectively. IMRs set to each of the CSI processes shown in Table 1 are shown in Table 2.

TABLE 2

| IMR | eNB 1 | eNB 2 |
|---|---|---|
| IMR 0 | Muting | Data transmission |
| IMR 1 | Data transmission | Muting |
| IMR 2 | Muting | Muting |

A cell 1 performs muting in an IMR 0 and a cell 2 performs data transmission in the IMR 0. A UE is configured to measure interference from other cells except the cell 1 in the IMR 0. Similarly, the cell 2 performs muting in an IMR 1 and the cell 1 performs data transmission in the IMR 1. The UE is configured to measure interference from other cells except the cell 2 in the IMR 1. The cell 1 and the cell 2 perform muting in an IMR 2 and the UE is configured to measure interference from other cells except the cell 1 and the cell 2 in the IMR 2.

Hence, as shown in Table 1 and Table 2, if data is received from the cell 1, CSI information of the CSI process 0 indicates optimized RI, PMI and CQI information. If data is received from the cell 2, CSI information of the CSI process 1 indicates optimized RI, PMI and CQI information. If data is received from the cell 1 and there is no interference from the cell 2, CSI information of the CSI process 2 indicates optimized RI, PMI and CQI information.

It is preferable for a plurality of CSI processes set to a UE to share values subordinate to each other. For example, in case of joint transmission performed by the cell 1 and the cell 2, if a CSI process 1 considering a channel of the cell 1 as a signal part and a CSI process 2 considering a channel of the cell 2 as a signal part are set to a UE, it is able to easily perform JT scheduling only when ranks of the CSI process 1 and the CSI process 2 and a selected subband index are identical to each other.

A period or a pattern of transmitting a CSI-RS can be configured by a base station. In order to measure the CSI-RS, a UE should be aware of CSI-RS configuration of each CSI-RS antenna port of a cell to which the UE belongs thereto. The CSI-RS configuration can include a DL subframe index in which the CSI-RS is transmitted, time-frequency location of a CSI-RS resource element (RE) in a transmission subframe (e.g., the CSI-RS patterns shown in FIGS. 8(a) to 8(e)) and a CSI-RS sequence (a sequence used for a CSI-RS usage, the sequence is pseudo-randomly generated according to a prescribed rule based on a slot number, a cell ID, a CP length and the like), etc. In particular, a plurality of CSI-RS configurations can be used by a random (given) base station and the base station can inform a UE(s) in a cell of a CSI-RS configuration to be used for the UE(s).

Since it is necessary to identify a CSI-RS for each antenna port, resources to which the CSI-RS for each antenna port is transmitted should be orthogonal to each other. As mentioned earlier with reference to FIG. 8, the CSI-RS for each antenna port can be multiplexed by the FDM, the TDM and/or the CDM scheme using an orthogonal frequency resource, an orthogonal time resource and/or an orthogonal code resource.

When the base station informs the UEs belonging to a cell of information on a CSI-RS (CSI-RS configuration), it is necessary for the base station to preferentially inform the UEs of information on time-frequency to which the CSI-RS for each antenna port is mapped. Specifically, information on time can include numbers of subframes in which a CSI-RS is transmitted, a period of transmitting a CSI-RS, a subframe offset of transmitting a CSI-RS, an OFDM symbol number in which a CSI-RS resource element (RE) of a specific antenna is transmitted, etc. Information on frequency can include a frequency space of transmitting a CSI-RS resource element (RE) of a specific antenna, an RE offset on a frequency axis, a shift value, etc.

Figure 9:
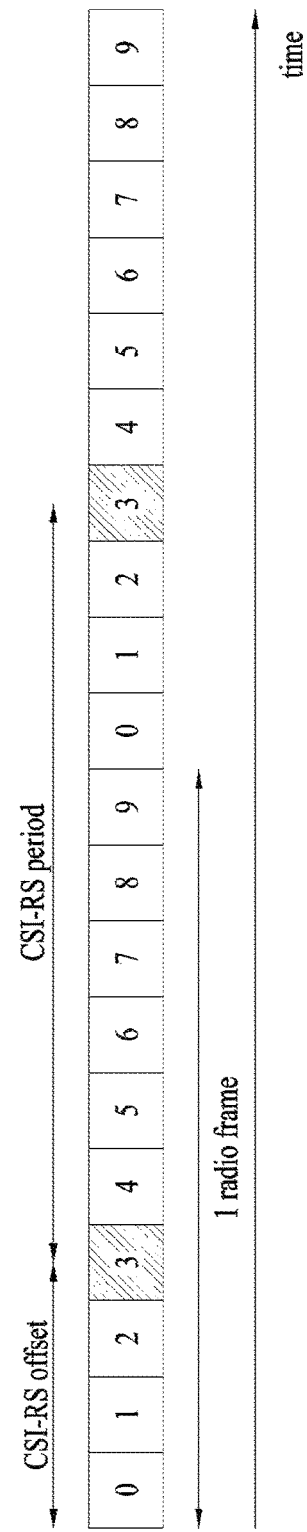
FIG. 9 is a diagram for explaining an example of a scheme of periodically transmitting a CSI-RS.

FIG. 9 is a diagram for explaining an example of a scheme of periodically transmitting a CSI-RS. A CSI-RS can be periodically transmitted with a period of an integer multiple of a subframe (e.g., 5-subframe period, 10-subframe period, 20-subframe period, 40-subframe period or 80-subframe period).

FIG. 9 shows a radio frame configured by 10 subframes (subframe number 0 to 9). In FIG. 9, for example, a transmission period of a CSI-RS of a base station corresponds to 10 ms (i.e., 10 subframes) and a CSI-RS transmission offset corresponds to 3. The offset value may vary depending on a base station to make CSI-RSs of many cells to be evenly distributed in time domain. If a CSI-RS is transmitted with a period of 10 ms, an offset value may have one selected from among 0 to 9. Similarly, if a CSI-RS is transmitted with a period of 5 ms, an offset value may have one selected from among 0 to 4. If a CSI-RS is transmitted with a period of 20 ms, an offset value may have one selected from among 0 to 19. If a CSI-RS is transmitted with a period of 40 ms, an offset value may have one selected from among 0 to 39. If a CSI-RS is transmitted with a period of 80 ms, an offset value may have one selected from among 0 to 79. The offset value corresponds to a value of a subframe in which CSI-RS transmission starts by a base station transmitting a CSI-RS with a prescribed period. If the base station informs a UE of a transmission period of a CSI-RS and an offset value, the UE is able to receive the CSI-RS of the base station at a corresponding subframe position using the transmission period and the offset value. The UE measures a channel through the received CSI-RS and may be then able to report such information as a CQI, a PMI and/or an RI (rank indicator) to the base station. In the present disclosure, the CQI, the PMI and/or the RI can be commonly referred to as CQI (or CSI) except a case of individually explaining the CQI, the PMI and/or the RI. And, the CSI-RS transmission period and the offset can be separately designated according to a CSI-RS configuration.

Figure 10:
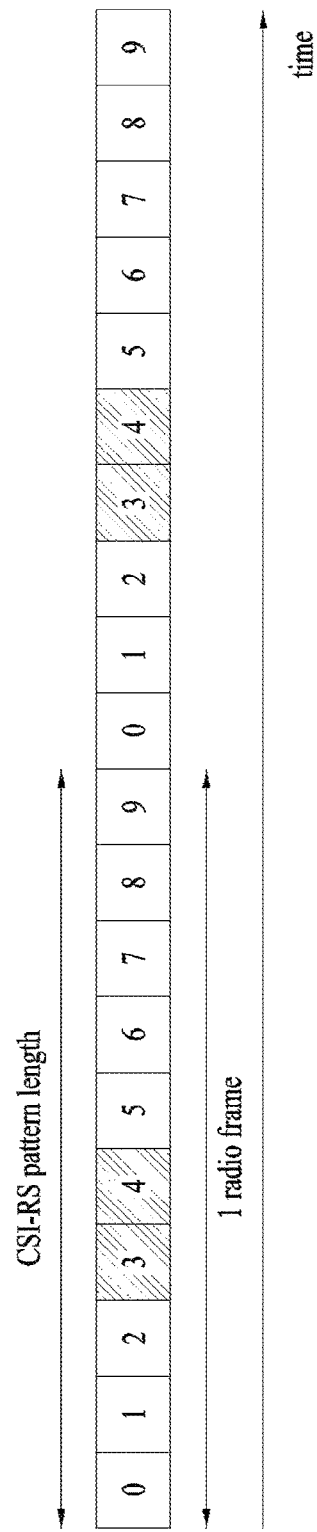
FIG. 10 is a diagram for explaining an example of a scheme of aperiodically transmitting a CSI-RS.

FIG. 10 is a diagram for explaining an example of a scheme of aperiodically transmitting a CSI-RS. In FIG. 10, for example, one radio frame is configured by 10 subframes (subframe number 0 to 9). As shown in FIG. 10, a subframe in which a CSI-RS is transmitted can be represented as a specific pattern. For example, a CSI-RS transmission pattern can be configured by a 10-subframe unit and whether to transmit a CSI-RS can be indicated by a 1-bit indicator in each subframe. An example of FIG. 10 shows a pattern of transmitting a CSI-RS in a subframe index 3 and 4 among 10 subframes (subframe index 0 to 9). The indicator can be provided to a UE via higher layer signaling.

As mentioned in the foregoing description, configuration of CSI-RS transmission can be variously configured. In order to make a UE properly receive a CSI-RS and perform channel measurement, it is necessary for a base station to inform the UE of CSI-RS configuration. Embodiments of the present invention for informing a UE of CSI-RS configuration are explained in the following.

Method of Indicating CSI-RS Configuration

In general, a base station is able to inform a UE of CSI-RS configuration by one of two schemes in the following.

A first scheme is a scheme that a base station broadcasts information on CSI-RS configuration to UEs using dynamic broadcast channel (DBCH) signaling.

In a legacy LTE system, when contents on system information are informed to UEs, the information is transmitted to the UEs via a BCH (broadcasting channel). Yet, if the contents are too much and the BCH is unable to carry all of the contents, the base station transmits the system information using a scheme used for transmitting a general downlink data. And, PDCCH CRC of corresponding data is transmitted in a manner of being masked using SI-RNTI, i.e., system information RNTI, instead of a specific UE ID (e.g., C-RNTI). In this case, actual system information is transmitted to a PDSCH region together with a general unicast data. By doing so, all UEs in a cell decode PDCCH using the SI-RNTI, decode PDSCH indicated by the corresponding PDCCH and may be then able to obtain the system information. This sort of broadcasting scheme may be referred to as a DBCH (dynamic BCH) to differentiate it from a general broadcasting scheme, i.e., PBCH (physical BCH).

Meanwhile, system information broadcasted in a legacy LTE system can be divided into two types. One is a master information block (MIB) transmitted on the PBCH and another one is a system information block (SIB) transmitted on a PDSCH region in a manner of being multiplexed with a general unicast data. In the legacy LTE system, since informations transmitted with an SIB type 1 to an SIB type 8 (SIB1 to SIB8) are already defined, it may be able to define a new SIB type to transmit information on a CSI-RS configuration corresponding to new system information not defined in the legacy SIB types. For example, it may be able to define SIB9 or SIB10 and the base station can inform UEs within a cell of the information on the CSI-RS configuration via the SIB9 or the SIB10 using a DBCH scheme.

A second scheme is a scheme that a base station informs each UE of information on CSI-RS configuration using RRC (radio resource control) signaling. In particular, the information on the CSI-RS can be provided to each of the UEs within a cell using dedicated RRC signaling. For example, in the course of establishing a connection with the base station via an initial access or handover of a UE, the base station can inform the UE of the CSI-RS configuration via RRC signaling. Or, when the base station transmits an RRC signaling message, which requires channel status feedback based on CSI-RS measurement, to the UE, the base station can inform the UE of the CSI-RS configuration via the RRC signaling message.

Indication of CSI-RS Configuration

A random base station may use a plurality of CSI-RS configurations and the base station can transmit a CSI-RS according to each of a plurality of the CSI-RS configurations to a UE in a predetermined subframe. In this case, the base station informs the UE of a plurality of the CSI-RS configurations and may be able to inform the UE of a CSI-RS to be used for measuring a channel state for making a feedback on a CQI (channel quality information) or CSI (channel state information).

Embodiments for a base station to indicate a CSI-RS configuration to be used in a UE and a CSI-RS to be used for measuring a channel are explained in the following.

Figure 11:
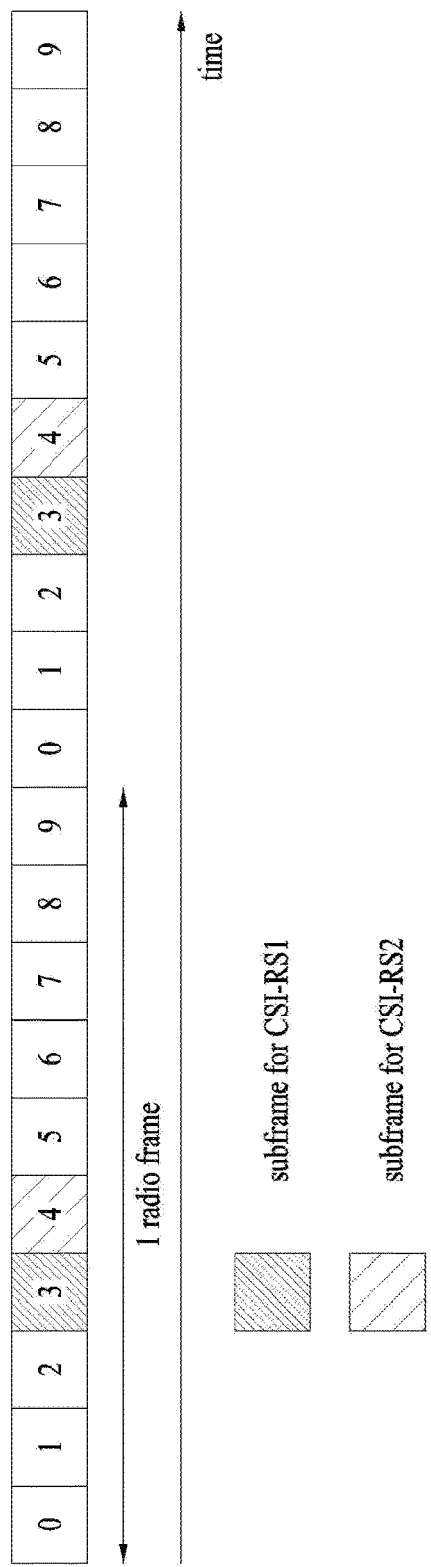
FIG. 11 is a diagram for explaining an example of using two CSI-RS configurations.

FIG. 11 is a diagram for explaining an example of using two CSI-RS configurations. In FIG. 11, for example, one radio frame is configured by 10 subframes (subframe number 0 to 9). In FIG. 11, in case of a first CSI-RS configuration, i.e., a CSI-RS1, a transmission period of a CSI-RS is 10 ms and a transmission offset of a CSI-RS is 3. In FIG. 11, in case of a second CSI-RS configuration, i.e., a CSI-RS2, a transmission period of a CSI-RS is 10 ms and a transmission offset of a CSI-RS is 4. A base station informs a UE of information on two CSI-RS configurations and may be able to inform the UE of a CSI-RS configuration to be used for CQI (or CSI) feedback among the two CSI-RS configurations.

If the base station asks the UE to make a CQI feedback on a specific CSI-RS configuration, the UE can perform channel state measurement using a CSI-RS belonging to the CSI-RS configuration only. Specifically, a channel state is determined based on CSI-RS reception quality, an amount of noise/interference and a function of a correlation coefficient. In this case, the CSI-RS reception quality is measured using the CSI-RS belonging to the CSI-RS configuration only. In order to measure the amount of noise/interference and the correlation coefficient (e.g., an interference covariance matrix indicating interference direction, etc.), measurement can be performed in a subframe in which the CSI-RS is transmitted or a subframe designated in advance. For example, in the embodiment of FIG. 11, if the base station asks the UE to make a feedback on the first CSI-RS configuration (CSI-RS1), the UE measures reception quality using a CSI-RS transmitted in a fourth subframe (a subframe index 3) of a radio frame and the UE can be separately designated to use an add number subframe to measure the amount of noise/interference and the correlation coefficient. Or, it is able to designate the UE to measure the CSI-RS reception quality, the amount of noise/interference and the correlation coefficient in a specific single subframe (e.g., a subframe index 3) only.

For example, reception signal quality measured using a CSI-RS can be simply represented by SINR (signal-to-interference plus noise ratio) as S/(I+N) (in this case, S corresponds to strength of a reception signal, I corresponds to an amount of interference and N corresponds to an amount of noise). The S can be measured through a CSI-RS in a subframe including the CSI-RS in a subframe including a signal transmitted to a UE. Since the I and the N change according to an amount of interference received from a neighbor cell, direction of a signal received from a neighbor cell, and the like, the I and the N can be measured by an SRS transmitted in a subframe in which the S is measured or a separately designated subframe, etc.

In this case, the amount of noise/interference and the correlation coefficient can be measured in a resource element (RE) in which a CRS belonging to a corresponding subframe or a CSI-RS is transmitted. Or, in order to easily measure noise/interference, the noise/interference can be measured through a configured null RE. In order to measure noise/interference in a CRS or CSI-RS RE, a UE preferentially recovers a CRS or a CSI-RS and subtracts a result of the recovery from a reception signal to make a noise and interference signal to be remained only. By doing so, the UE is able to obtain statistics of noise/interference from the remained noise and the interference signal. A null RE may correspond to an empty RE (i.e., transmission power is 0 (zero)) in which no signal is transmitted by a base station. The null RE makes other base stations except the corresponding base station easily measure a signal. In order to measure an amount of noise/interference, it may use all of a CRS RE, a CSI-RS RE and a null RE. Or, a base station may designate REs to be used for measuring noise/interference for a UE. This is because it is necessary to properly designate an RE to be used for measuring noise/interference measured by the UE according to whether a signal of a neighbor cell transmitted to the RE corresponds to a data signal or a control signal. Since the signal of the neighbor cell transmitted to the RE varies according to whether or not synchronization between cells is matched, a CRS configuration, a CSI-RS configuration and the like, the base station identifies the signal of the neighbor cell and may be able to designate an RE in which measurement is to be performed for the UE. In particular, the base station can designate the UE to measure noise/interference using all or a part of the CRS RE, the CSI-RS RE and the null RE.

For example, the base station may use a plurality of CSI-RS configurations and may be able to inform the UE of a CSI-RS configuration to be used for CQI feedback and a null RE position while informing the UE of one or more CSI-RS configurations. In order to distinguish the CSI-RS configuration to be used for CQI feedback by the UE from a null RE transmitted by zero transmission power, the CSI-RS configuration to be used for CQI feedback by the UE may correspond to a CSI-RS configuration transmitted by non-zero transmission power. For example, if the base station informs the UE of a CSI-RS configuration in which the UE performs channel measurement, the UE can assume that a CSI-RS is transmitted by non-zero transmission power in the CSI-RS configuration. In addition, if the base station informs the UE of a CSI-RS configuration transmitted by zero transmission power (i.e., null RE position), the UE can assume that an RE position of the CSI-RS configuration corresponds to zero transmission power. In other word, when the base station informs the UE of a CSI-RS configuration of non-zero transmission power, if there exists a CSI-RS configuration of zero transmission power, the base station can inform the UE of a corresponding null RE position.

As a modified example of the method of indicating a CSI-RS configuration, the base station informs the UE of a plurality of CSI-RS configurations and may be able to inform the UE of all or a part of CSI-RS configurations to be used for CQI feedback among a plurality of the CSI-RS configurations. Hence, having received a request for CQI feedback on a plurality of the CSI-RS configurations, the UE measures a CQI using a CSI-RS corresponding to each CSI-RS configuration and may be then able to transmit a plurality of CQI information to the base station.

Or, in order to make the UE transmit a CQI for each of a plurality of the CSI-RS configurations, the base station can designate an uplink resource, which is necessary for the UE to transmit the CQI, in advance according to each CSI-RS configuration. Information on the uplink resource designation can be provided to the UE in advance via RRC signaling.

Or, the base station can dynamically trigger the UE to transmit a CQI for each of a plurality of CSI-RS configurations to the base station. Dynamic triggering of CQI transmission can be performed via PDCCH. It may inform the UE of a CSI-RS configuration for which a CQI is to be measured via PDCCH. Having received the PDCCH, the UE can feedback a CQI measurement result measured for the CSI-RS configuration designated by the PDCCH to the base station.

A transmission timing of a CSI-RS corresponding to each of a plurality of the CSI-RS configurations can be designated to be transmitted in a different subframe or an identical subframe. If CSI-RSs according to CSI-RS configurations different from each other are designated to be transmitted in an identical subframe, it may be necessary to distinguish the CSI-RSs from each other. In order to distinguish the CSI-RSs according to the CSI-RS configurations different from each other, it may be able to differently apply at least one selected from the group consisting of a time resource, a frequency resource and a code resource of CSI-RS transmission. For example, an RE position in which a CSI-RS is transmitted can be differently designated in a subframe according to a CSI-RS configuration (e.g., a CSI-RS according to one CSI-RS configuration is designated to be transmitted in an RE position shown in FIG. 8 (*a*) and a CSI-RS according to another CSI-RS configuration is designated to be transmitted in an RE position shown in FIG. 8 (*b*)) (distinction using a time and frequency resource). Or, if CSI-RSs according to CSI-RS configurations different from each other are transmitted in an identical RE position, the CSI-RSs can be distinguished from each other by differently using a CSI-RS scrambling code in the CSI-RS configurations different from each other (distinction using a code resource).

Method of Demodulating Signal

In a communication system in which a transmitting end uses a modulation scheme, a receiving end performs de-mapping. A de-mapping scheme can be mainly classified into a hard de-mapping scheme and a soft de-mapping scheme. Since the hard de-mapping scheme preferentially finds out a constellation value, which was used to de-map a reception symbol value through hard decision, and then obtains a Euclidean distance, the hard de-mapping scheme may have performance deterioration compared to the soft de-mapping scheme in which decision is not included. Embodiments of the present invention described in the following relate to the soft de-mapping scheme.

In the de-mapping stage, Euclidean distance with an observation point is calculated for theoretically all constellation points that construct mapping. In this case, a maximum likelihood (ML) de-mapper for comparing a case that a bit of a preferred point corresponds to 0 and a case that a bit of a preferred point corresponds to 1 with each other is optimal.

Figure 12:
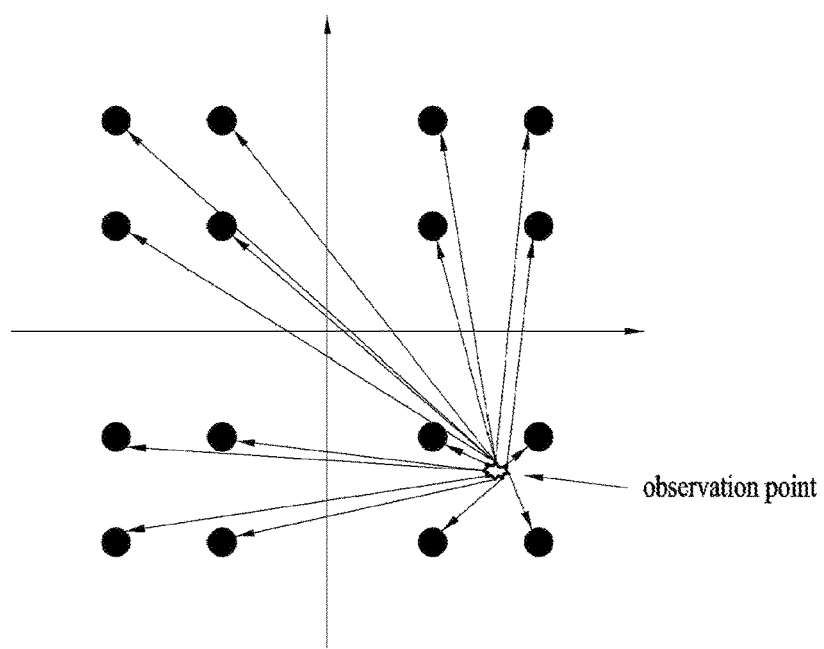
FIG. 12 is a diagram for an example of a ML de-mapping method.

FIG. 12 is a diagram for an example of a ML de-mapping method.

Yet, since the ML de-mapper includes considerable amount of exponentials and log operations, the ML-de-mapper requires high complexity. As a generally used soft de-mapper of relatively low complexity, a max-log de-mapper is used. The max-log de-mapper does not calculate a distance between all constellation points and an observation point. Instead, the max-log de-mapper obtains LLR (Log-Likelihood Ratio) of a corresponding bit using a distance between most adjacent two points only among constellation points that a bit of a preferred point corresponds to 0 or 1.

Figure 13:
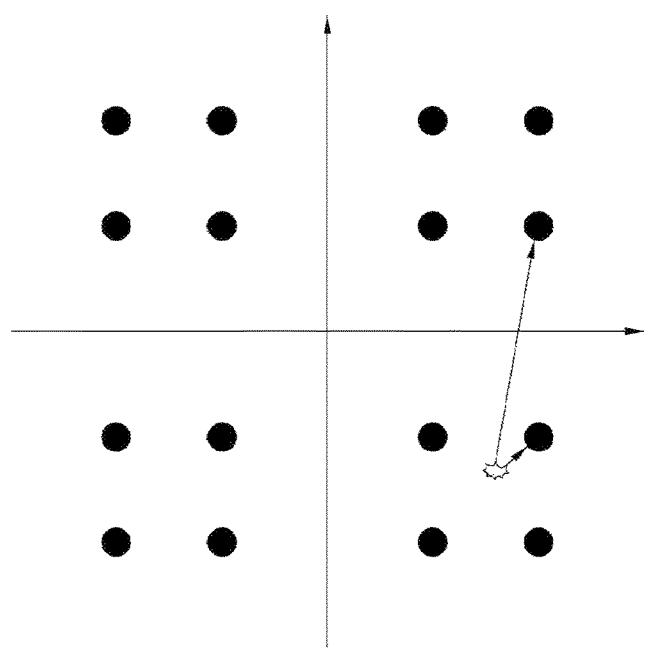
FIG. 13 is a diagram for an example of a Max-log de-mapping method.

FIG. 13 is a diagram for an example of a Max-log de-mapping method.

In case of Max-log, similar to the ML, distance comparison is necessary. Yet, since LLR is obtained using a ratio of two distances only, exponential or a log operation is not necessary.

As an evolved version of the Max-log scheme, there is a sphere decoding scheme that intends to reduce a distance comparison count.

Figure 14:
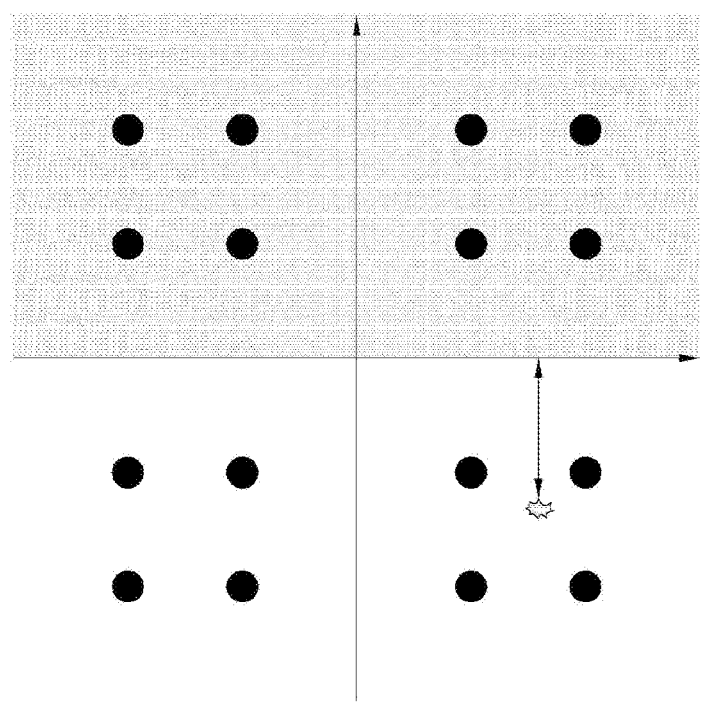
FIG. 14 is a diagram for an example of a BAB de-mapping scheme for a first bit.

Besides, there is a boundary-approximation-based (BAB) soft de-mapper. According to the boundary-approximation-based (BAB) soft de-mapper, constellation points sets are divided into a constellation points set of which a bit of a specific point corresponds to 0 and a constellation points set of which a bit of a specific point corresponds to 1 and LLR is calculated using a distance to a boundary between the two sets only. In this case, in case of $2^m$-QAM, the specific point corresponds to a position of a specific bit among m number of bit strings. FIG. 14 shows the BAB de-mapping scheme for a first bit.

The distance value may become an intuitive metric for determining a probability whether a bit corresponds to 0 or 1. If an observation point is included in a set of which a bit corresponds to 0, it may be able to anticipate a probability that the bit corresponds to 1 using the distance value.

In case of using Gray mapping for simply distinguishing two constellation point sets from each other, the BAB soft de-mapper can very simply obtain an LLR value.

Figure 15:
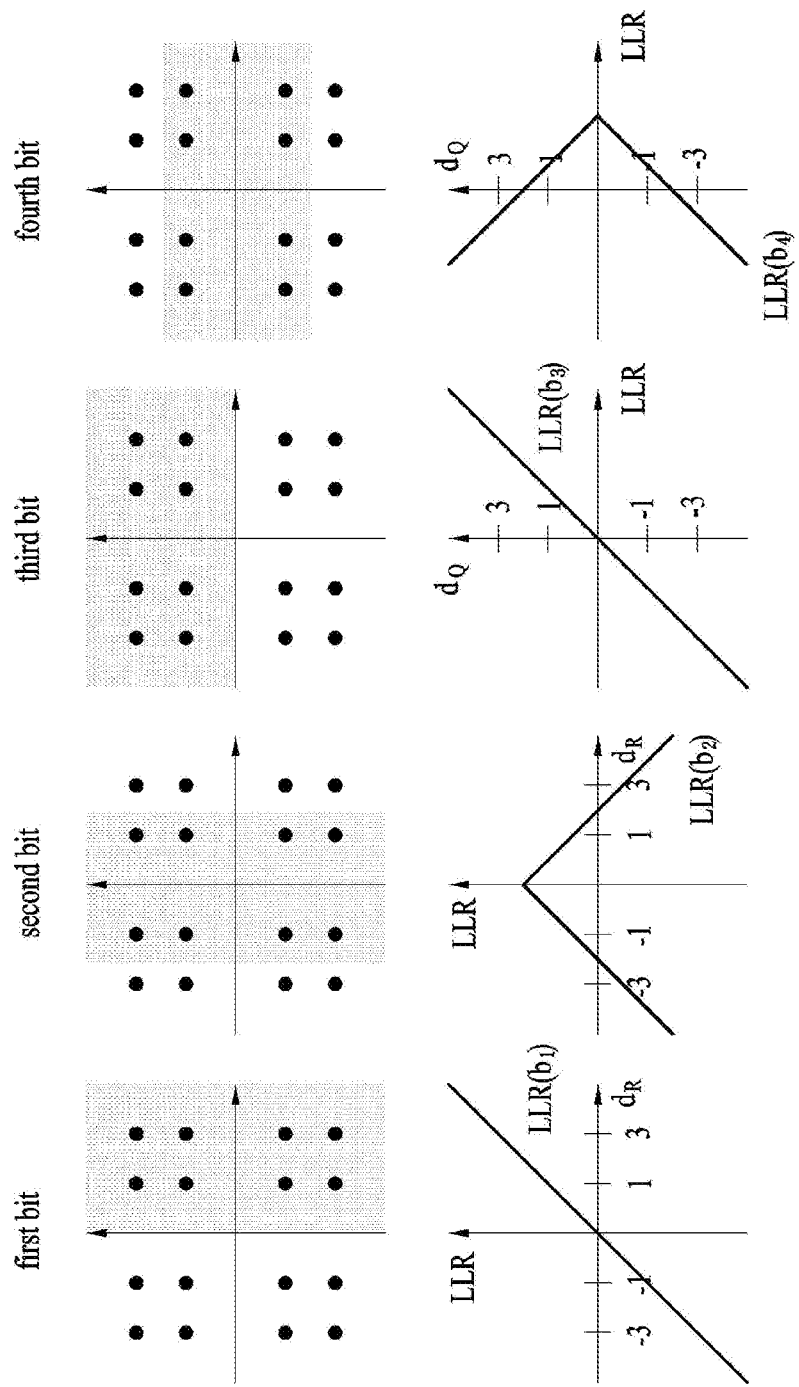
FIG. 15 is a diagram for an example of a process of obtaining an LLR value for a bit of a specific position according to each bit in case of 16-QAM Gray mapping.

FIG. 15 is a diagram for an example of a process of obtaining an LLR value for a bit of a specific position according to each bit in case of 16-QAM Gray mapping.

Referring to FIG. 15, when the BAB soft de-mapper is used for Gray mapping, it may be able to obtain an LLR value of a bit of each position using either $d_R$ corresponding to a real part of an observation point or $d_Q$ corresponding to an imaginary part only.

Hence, similar to the max-log scheme, the BAB soft-de-mapper does not use exponential and log operation. Moreover, in case of $M(=2^m)$-QAM system, unlike the ML or the max-log performing distance comparison as many as $m \cdot 2^m$ times, the BAB soft-de-mapper performs the distance comparison m times only. As a result, it may be able to reduce complexity.

An LLR used in the BAB de-mapping scheme can be represented as equation 1 in the following. In this case, a distance equation $(D_{l,k})$ for '1' and '0' points closest from an observation point becomes key for the BAB de-mapping scheme.

$$LLR(b_{l,k}) == \qquad [\text{Equation 1}]$$

$$\frac{|G_{ch}(i)|^2}{4}\left\{\min_{a_l \in s'^{(0)}_{l,k}}(y_l[i]-a_l)^2 - \min_{a_l \in s'^{(1)}_{l,k}}(y_l[i]-a_l)^2\right\} \stackrel{\Delta}{==}$$

$$|G_{ch}(i)|^2 \cdot D_{l,k}$$

The soft de-mapping scheme has higher complexity as a modulation order is increasing. Hence, it is essential to use various soft de-mapping schemes of low complexity. Among the various soft de-mapping schemes, it is known as boundary-approximation-based (BAB) soft de-mapper has lower complexity compared to the generally used max-log soft de-mapper. However, the BAB soft de-mapper shows a complex boundary in non-Gray bit labeling and it is difficult to use the BAB soft de-mapper.

As a demerit of the BAB soft de-mapper, in case of performing non-Gray mapping that a boundary between two constellation sets of which a bit of a specific position corresponds to 0 or 1 is complex, since the number of boundaries increases, it is necessary to perform more distance calculations. And, it is difficult to obtain an LLR value using a combination of distances.

Figure 16:
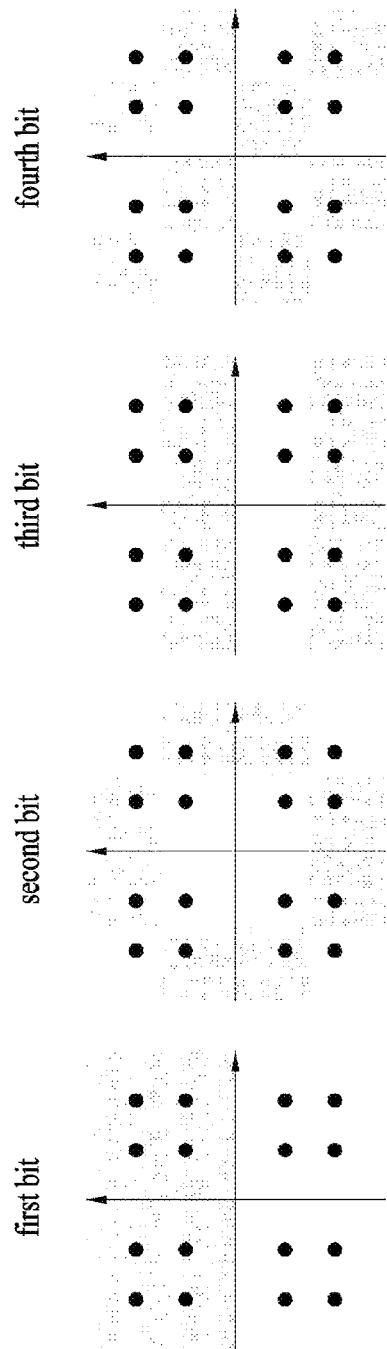
FIG. 16 is a diagram for an example of '1', '0' point regions when BAB de-mapper is applied to 16-QAM SP mapping.

FIG. 16 is a diagram for an example of '1', '0' point regions when BAB de-mapper is applied to 16-QAM SP mapping. FIG. 16 shows a boundary between constellation point sets for the BAB soft de-mapper when set-partitioned (SP) mapping, which is generally used as a non-Gray mapping method, is performed. Referring to FIG. 16, it is able to see that boundary structures for a second bit and a fourth bit are relatively complex.

De-Mapping Method According to Embodiment of the Present Invention

In the following, a BAB de-mapping scheme capable of being used for SP mapping irrespective of a modulation order is explained as embodiment of the present invention. For clarity, as shown in FIG. 16, the present invention considers that a white region corresponds to a constellation value '1' of a corresponding bit and a dark region corresponds to a constellation value '0'.

Figure 17:
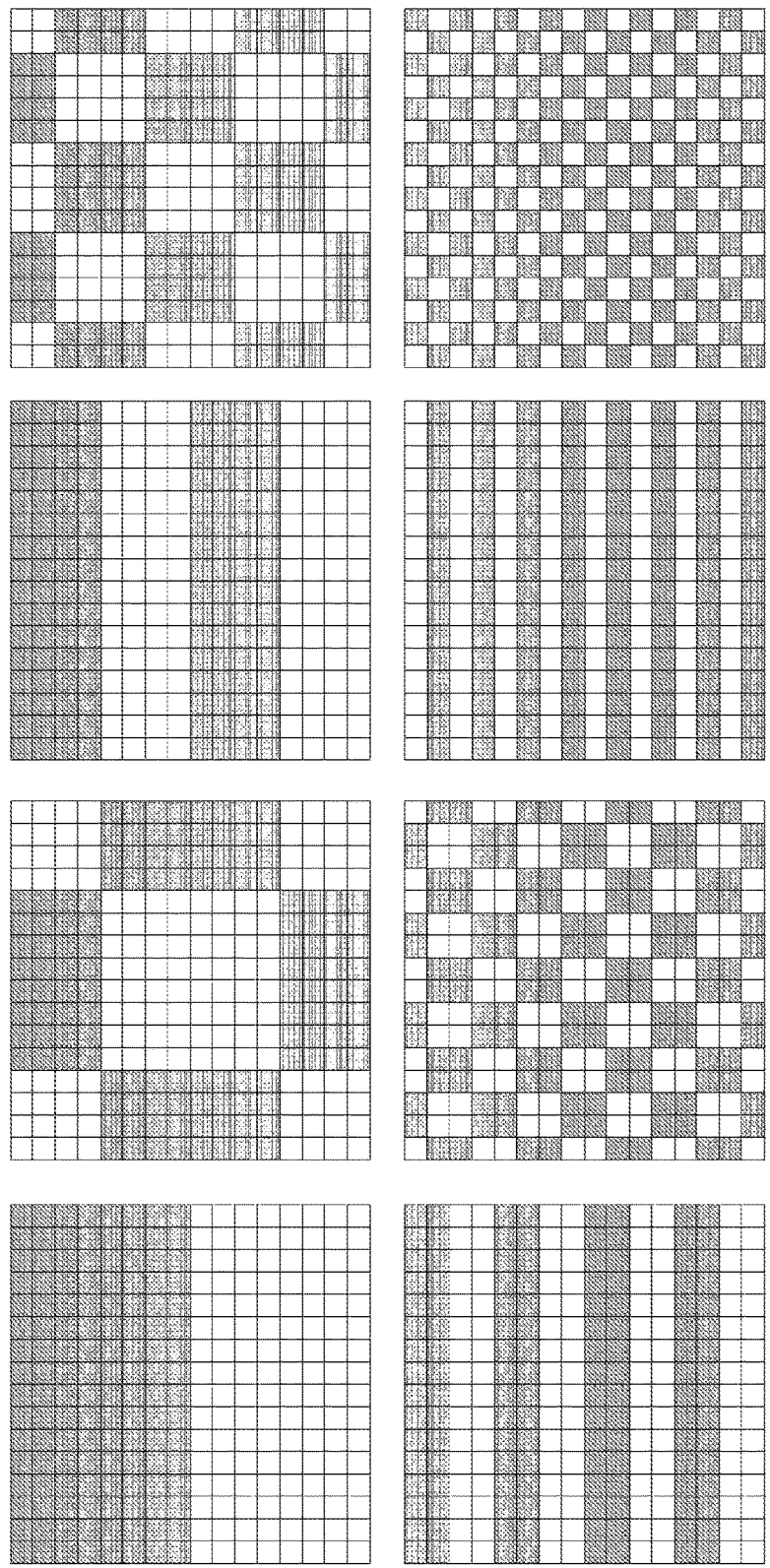
FIG. 17 is a diagram for an example of '1', '0' point regions when BAB de-mapper is applied to 256-QAM SP mapping.

As a concrete example, 16QAM arrangement and 256QAM arrangement for constellation points '1' and '0' in SP mapping are shown in FIG. 16 and FIG. 17, respectively.

Referring to FIGS. 16 and 17, since the number of boundaries is huge and complex, it is necessary to have a method capable of finding out the boundaries with a simple rule.

Referring to FIG. 17, FIG. 17 is a diagram for an example of '1', '0' point regions when BAB de-mapper is applied to 256-QAM SP mapping. In FIG. 17, regions for '1' and '0' are sequentially shown from the upper left starting from a first bit.

Since a form of an odd number bit is different from a form of an even number bit in SP mapping, the even number bit is explained first. Among even number bits, a region of a second bit and a region of a fourth bit are briefly shown in FIG. 18.

Figure 18:
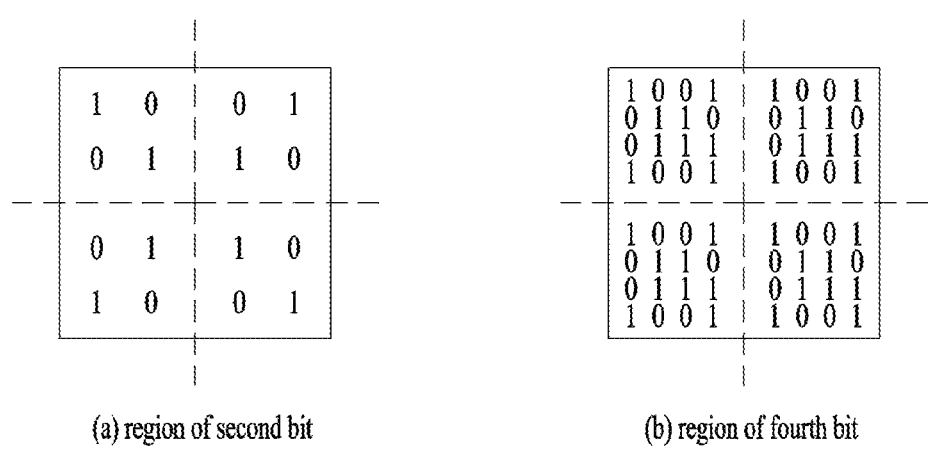

Referring to FIG. 18 (a), quadrant 2 is repeated in quadrant 4 and bit values have a reversed form in quadrant 1 and quadrant 3, respectively. Referring to FIG. 18 (b), quadrant 2 region is repeated over the entire region. And, although a size is different, a pattern of a second bit region is included in each quadrant of a fourth bit.

Figure 19:
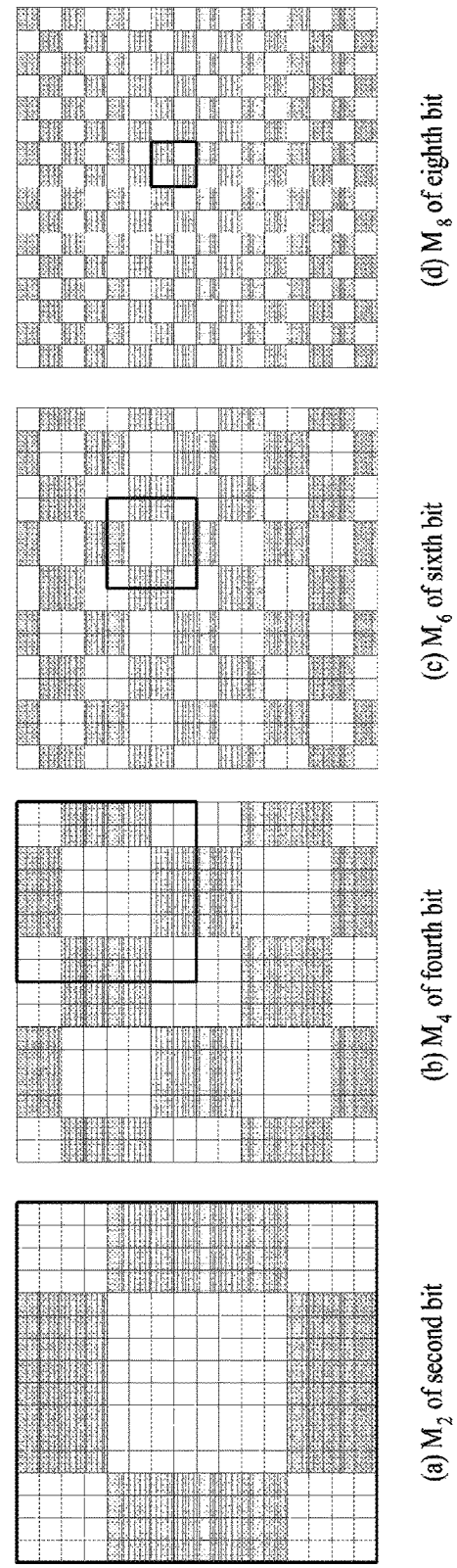
FIG. 19 is a diagram for a pattern repeat minimum unit matrix for 256QAM SP mapping even number bit.

FIG. 19 is a diagram for a pattern repeat minimum unit matrix for 256QAM SP mapping even number bit.

In particular, if it is assumed that a pattern repeat minimum unit matrix corresponds to M, a matrix $M_k$ (where k corresponds to a position of a corresponding bit among 8-bit string (256QAM)) for an even number bit is shown in FIG. 19. Since the BAB considers '1' and '0' points closest to an observation point only, it may be able to calculate a distance using the matrix M only rather than the entire matrix in a repeated form.

In case of 256QAM, there are 4 pattern repeat minimum unit matrixes for an even number bit (2 pattern repeat minimum unit matrixes for 16QAM). In case of $2^m$-QAM, $M_k$ corresponds to a square matrix having a size of $2^{(m/2+1)-(k/2)}$. For example, a second bit can be represented as follows using a base matrix $B_2$ for a matrix $M_2$ (FIG. 19 (a)).

$$B_2 = B \otimes \begin{bmatrix} 1 & 1 & 1 & 1 \\ 1 & 1 & 1 & 1 \\ 1 & 1 & 1 & 1 \\ 1 & 1 & 1 & 1 \end{bmatrix} = \begin{bmatrix} 1 & 0 \\ 0 & 1 \end{bmatrix} \otimes \begin{bmatrix} 1 & 1 & 1 & 1 \\ 1 & 1 & 1 & 1 \\ 1 & 1 & 1 & 1 \\ 1 & 1 & 1 & 1 \end{bmatrix} = \begin{bmatrix} 1 & 1 & 1 & 1 & 0 & 0 & 0 & 0 \\ 1 & 1 & 1 & 1 & 0 & 0 & 0 & 0 \\ 1 & 1 & 1 & 1 & 0 & 0 & 0 & 0 \\ 1 & 1 & 1 & 1 & 0 & 0 & 0 & 0 \\ 0 & 0 & 0 & 0 & 1 & 1 & 1 & 1 \\ 0 & 0 & 0 & 0 & 1 & 1 & 1 & 1 \\ 0 & 0 & 0 & 0 & 1 & 1 & 1 & 1 \\ 0 & 0 & 0 & 0 & 1 & 1 & 1 & 1 \end{bmatrix}$$ [Equation 2]

$$M_2 = B_2 \otimes \begin{bmatrix} 1 & -1 \\ -1 & 1 \end{bmatrix} = \begin{bmatrix} B_2 & -B_2 \\ -B_2 & B_2 \end{bmatrix}$$ [Equation 3]

In this case, '−1' indicates a bit flip. In particular, '0' is changed to '1' and '1' is changed to '0'. ⊗ indicates a matrix product (Knonecker product).

By doing so, a matrix $M_4$ (FIG. 19 (b)) can be represented as follows using a base matrix $B_4$ for a fourth bit.

$$B_4 = B \otimes \begin{bmatrix} 1 & 1 \\ 1 & 1 \end{bmatrix} = \begin{bmatrix} 1 & 0 \\ 0 & 1 \end{bmatrix} \otimes \begin{bmatrix} 1 & 1 \\ 1 & 1 \end{bmatrix} = \begin{bmatrix} 1 & 1 & 0 & 0 \\ 1 & 1 & 0 & 0 \\ 0 & 0 & 1 & 1 \\ 0 & 0 & 1 & 1 \end{bmatrix}$$ [Equation 4]

$$M_4 = B_4 \otimes \begin{bmatrix} 1 & -1 \\ -1 & 1 \end{bmatrix} = \begin{bmatrix} B_4 & -B_4 \\ -B_4 & B_4 \end{bmatrix}$$ [Equation 5]

Practically, since $M_8$ shown in FIG. 19 (d) has a form that '0' and '1' are sequentially repeated, a remaining matrix M except the $M_8$ has a relation shown in the following (k corresponds to an even number equal to or greater than 2).

$$M_{k+2} = M_k \otimes \begin{bmatrix} 1 & 1 \\ 1 & 1 \end{bmatrix}$$ [Equation 6]

Since the matrix M is repeated, it may calculate a distance within a matrix. In this case, when the BAB is used, unlike the gray mapping using $y_I$ (real number axis value) or $y_Q$ (imaginary number axis value) of a reception symbol only, it is necessary to use both the $y_I$ and the $y_Q$ of the reception symbol at the same time in an even number bit while non-gray mapping is performed to apply a distance for calculating LLR as shown in equation 1. As mentioned in the following description, it may use a $y_Q$ value only for an odd number bit while the non-gray mapping is performed.

Since a distance is considered only in a repeated matrix M, it is necessary to have a process of mapping a value of a reception symbol to the matrix M. First of all, the remaining even number bits except an eighth bit have an symmetrical form in x and y axis. Hence, it may be able to calculate a distance and a sign in a red color region close to a starting point in FIG. 7 using the $y_I$ and the $y_Q$ of the reception symbol.

In order to map a reception symbol to a matrix M, as shown in equations in the following, it may be able to newly map a reception symbol using the $y_I$ and the $Y_Q$.

$$y'_I = y_I - \lceil y_I / Z \rceil \times Z$$

$$y'_Q = y_Q - \lceil y_Q / Z \rceil \times Z$$ [Equation 7]

In this case, $\lceil x \rceil$ indicates a smallest integer equal to or greater than an x value and z indicates a size of the repeated matrix M. In case of $2^m$-QAM, the z may have such a relation as equation 8 in the following for $M_k$ (k is an even number equal to or greater than 2).

$$Z = 2^{(m/2+1)-k/2}$$ [Equation 8]

For example, in case of $M_4$ in 256QAM, the z becomes 8.

In this case, the matrix M has a boundary in x and y axis on the basis of z/2. Hence, the $D_{I,K}$ of equation 1 appears as $D_k$ (k is an even number equal to or greater than 2) that varies according to a bit due to the simultaneous use of the x and the y axis. In case of $2^m$-QAM, $|D_K|$ for $M_k$ (k is an even number equal to or greater than 2) can be represented by equation described in the following (a method of calculating a sign is descried later).

$$j = 0$$ [Equation 9]

for $i = 1$ to $2^{(m/2-1)-k/2}$ $$|D_k| = \left(\frac{j+2}{2}\right) \times \left(\min(|z/2 - y'_I|, |z/2 - y'_Q|) - \left(\frac{j+2}{2} - 1\right)\right),$$

$$j < \min(|z/2 - y'_I|, |z/2 - y'_Q|) \le j + 2$$

$$j = j + 2$$

For example, in case 256QAM, $M_4$ can be represented as equation described in the following.

$$|D_4|=\min(|4-y'_I|,|4-y'_Q|), 0 \leq \min(|4-y'_I|,|4-y'_Q|) \leq 2$$

$$|D_4|=2(\min(|4-y'_I|,|4-y'_Q|)-1), 2<\min(|4-y'_I|,|4-y'_Q|) \leq 4$$

[Equation 10]

A distance for each bit is obtained by performing mapping using the matrix M. On the other hand, in order to obtain a sign, it may consider a region shown in FIG. 18. In case of $2^m$-QAM, a sign for quadrant 1 among a $k^{th}$ bit (k is an even number equal to or greater than 2) can be obtained using equation described in the following.

$$(-1)^{[y'_I/(Z/2)]+[y'_Q/Z/2)]}$$

[Equation 11]

In this case, [x] corresponds to a maximum integer equal to or less than x. In a broad sense, the entire quadrants can be represented using equation described in the following.

$$(-1)^{[y''_I/(Z/2)]+[y''_Q/Z/2)]},$$

[Equation 12]

if $y_I<0$, the $y''_I=-y_I$
if $y_Q<0$, the $y''_Q=-y_Q$

Figure 20:
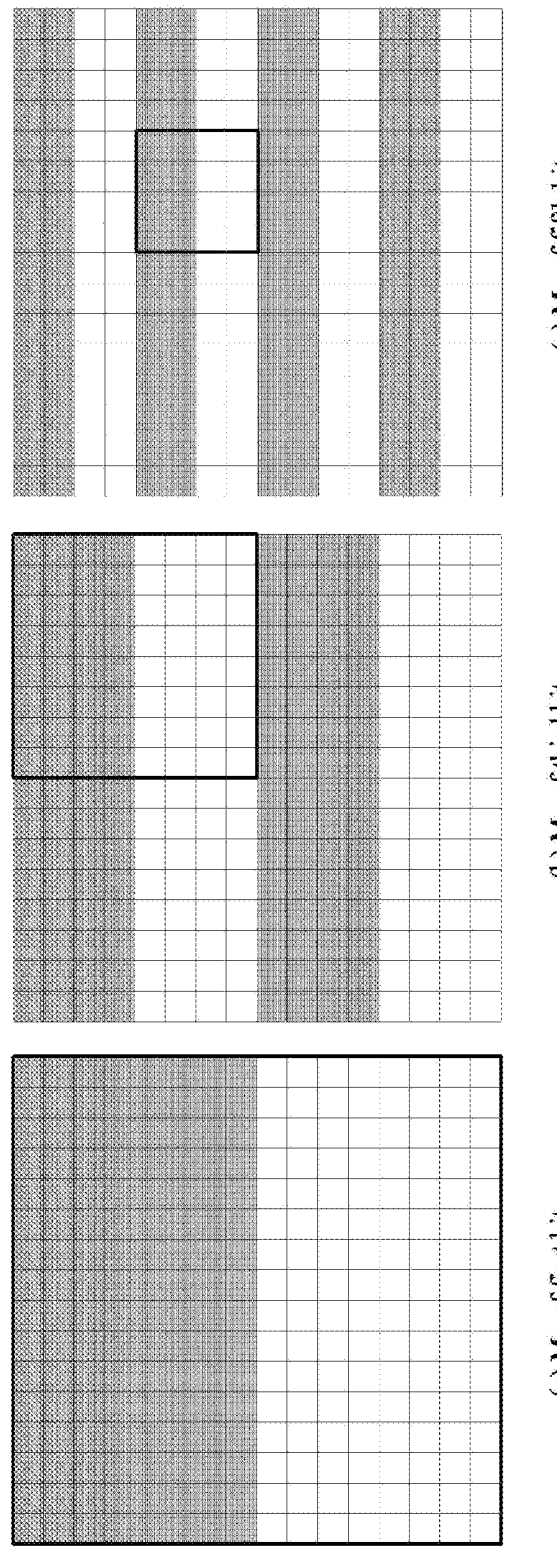
FIG. 20 is a diagram for a pattern repeat minimum unit matrix for 256QAM SP mapping odd number bit.

Similar to an even number bit, an odd number bit is explained in the following except a seventh bit corresponding to the last bit. As shown in FIG. 17, $D_K$ can be determined as an $y_Q$ value irrespective of a $y_I$ value. Similar to an even number bit, as shown in FIG. 20, it may use a pattern repeat minimum unit to determine a distance and a sign. FIG. 20 is a diagram for a pattern repeat minimum unit matrix for 256QAM SP mapping odd number bit.

Figure 21:
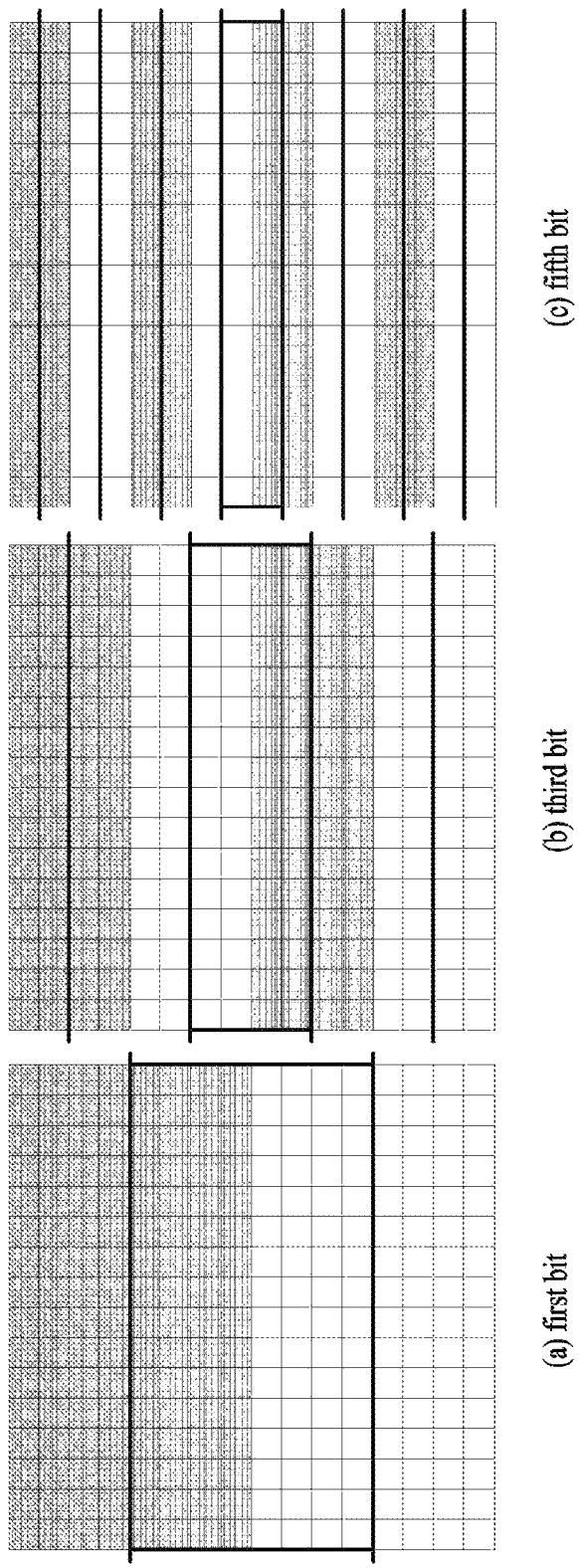
FIG. 21 is a diagram for a reference line of a symmetrical section for 256QAM SP mapping odd number bit.

As a different method, when a boundary is directly considered without using a pattern repeat minimum unit matrix, as shown in FIG. 21, it may have a section where a distance is symmetrical. FIG. 21 is a diagram for a reference line of a symmetrical section for 256QAM SP mapping odd number bit.

First of all, DK for constellation located at the inside of a reference line is explained. Constellation between a reference line and a reference line can be considered as a repeated pattern. Hence, similar to an even number bit, $y_Q$ value is mapped to between reference lines at the very center (red rectangular). In case of $2^m$-QAM, in order to map a reception symbol to a $k^{th}$ bit (k is an odd number equal to or greater than 1), it may be able to newly map the reception symbol using the $y_Q$ as shown in the following equation.

$$y'_Q = y_Q - \text{sign}(y_Q) \cdot \left( \left\lfloor \frac{|y_Q - \text{sign}(y_Q) \cdot z/2|}{z} \right\rfloor + 1 \right) \cdot z$$

[Equation 13]

In this case, sign (x) indicates a sign for x. In particular, a sign (−5) indicates −1 and a sign (+3) indicates +1. z corresponds to a value related to a size of a mapping region and the z can be represented as equation described in the following.

$$Z = 2^{m/2-(k-1)/2}$$

[Equation 14]

For example, in case of a third bit in 256QAM, the z becomes 8.

In case of $2^m$-QAM, $|D_K|$ for $M_k$ (k is an odd number equal to or greater than 1) can be represented by equation described in the following.

$$j = 0$$

for $i = 1$ to $2^{(m/2-1)-(k+1)/2}$

[Equation 15]

-continued $$|D_k| = \left(\frac{j+2}{2}\right) \times \left(|y'_Q| - \left(\frac{j+2}{2}-1\right)\right), j < y'_Q \leq j+2$$

$$j = j+2$$

$$j = 0$$

for $i = 1$ to $2^{(m/2-1)-(k+1)/2}$ $$|D_k| = \left(\frac{j+2}{2}\right) \times \left(|y'_Q| - \left(\frac{j+2}{2}-1\right)\right), j-2 < y'_Q \leq j$$

$$j = j-2$$

The constellation located at the outside of a reference line can be represented by equation described in the following.

$$j = 2^{m/2} - 2^{m/2-(k+1)/2}$$

[Equation 16]

for $i = 1$ to $2^{(m/2-1)-(k+1)/2}$ $$|D_k| = \left(\frac{j+2}{2}\right) \times \left(|y'_Q| - \left(\frac{j+2}{2}-1\right)\right), j < y'_Q \leq j+2$$

$$j = j+2$$

$$j = -(2^{m/2} - 2^{m/2-(k+1)/2})$$

for $i = 1$ to $2^{(m/2-1)-(k+1)/2}$ $$|D_k| = \left(\frac{j+2}{2}\right) \times \left(|y'_Q| - \left(\frac{j+2}{2}-1\right)\right), j-2 < y'_Q \leq j$$

$$j = j-2$$

In case of $2^m$-QAM, a sign for a $k^{th}$ bit (k is an add number equal to or greater than 1) can be represented by equation described in the following.

$$(-1)^{\lceil (y_Q + 2^{m/2})/Z \rceil}$$

[Equation 17]

Distances for the seventh and eighth bits are explained in the following. First of all, $|D_7|$ and a sign for the seventh bit can be represented as equation 19 and equation 20, respectively.

$$y'_Q = |y_Q| - \lfloor |y_Q|/Z \rfloor \times Z$$

[Equation 18]

$$|D_7| = y'_Q$$

[Equation 19]

$$(-1)^{\lceil (y_Q + 2^{m/2})/Z \rceil}$$

[Equation 20]

$|D_8|$ and a sign for the eighth bit can be represented as equation 22 and equation 23, respectively.

$$y'_I = |y_I| - \lceil |y_I|/Z \rceil \times Z$$

$$y'_Q = |y_Q| - \lceil |y_Q|/Z \rceil \times Z$$

[Equation 21]

$$|D_8| = \min(y'_I, y'_Q)$$

[Equation 22]

$$(-1)^{\lceil (y_I + 2^{m/2})/2 \rceil + \lceil (y_Q + 2^{m/2})/2 \rceil + 1}$$

[Equation 23]

FIG. 22 is a flowchart for an example of embodiments of the present invention.

First of all, a UE receives a modulation signal having a modulation order of $2^m$ (m is a natural number) [S2201].

Subsequently, first de-mapping constellation arrangement corresponding to a $k^{th}$ bit (k is an even number among natural numbers equal to or less than m) among m number of bits is determined [S2203] and second de-mapping constellation arrangement corresponding to a $n^{th}$ bit (n is an odd number among natural numbers equal to or less than m) among the m number of bits is determined [S2205].

Subsequently, the received modulation signal is demodulated using the first and the second de-mapping constellation arrangements. Since a detail modulation scheme for the signal is identical to what is mentioned earlier, detail explanation is omitted at this time.

FIG. 23 is a diagram for a base station and a user equipment applicable to one embodiment of the present invention.

If a relay is included in a wireless communication system, communication is performed between a base station and the relay in a backhaul link and communication is performed between the relay and a user equipment in an access link. Hence, the base station and the user equipment shown in the drawing can be replaced with the relay in accordance with a situation.

Referring to FIG. 23, a wireless communication system includes a base station 2310 and a user equipment 2320. The base station 2310 includes a processor 2313, a memory 2314 and a radio frequency (RF) unit 2311/2312. The processor 2313 can be configured to implement a procedure and/or methods proposed by the present invention. The memory 2314 is connected with the processor 2313 and stores various information associated with operations of the processor 2313. The RF unit 2316 is connected with the processor 2313 and transmits and/or receives a radio signal. The user equipment 2320 includes a processor 2323, a memory 2324 and a radio frequency (RF) unit 2321/2322. The processor 2323 can be configured to implement a procedure and/or methods proposed by the present invention. The memory 2324 is connected with the processor 2323 and stores various information associated with operations of the processor 2323. The RF unit 2321/2322 is connected with the processor 2323 and transmits and/or receives a radio signal. The base station 2310 and/or the user equipment 2320 can include a single antenna or multiple antennas.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'base station' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

The detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The present invention may be carried out in other specific ways than those set forth herein without departing from the spirit and essential characteristics of the present invention. The above detailed description is therefore to be construed in all aspects as illustrative and not restrictive. The scope of the invention should be determined by reasonable interpretation of the appended, and all changes coming within the meaning and equivalency range of the appended claims are to be embraced therein. Claims that are not explicitly cited in the appended claims may be presented in combination as an exemplary embodiment of the present invention or included as a new claim by subsequent amendment after the application is filed.

INDUSTRIAL APPLICABILITY

The present invention is applicable to wireless communication devices such as a UE, a relay, and an eNB.

What is claimed is:

1. A method of demodulating a signal, which is demodulated by a user equipment in a wireless access system, the method comprising:
receiving a modulation signal having a modulation order of $2^m$, wherein m is an even number greater than zero;
determining arrangement of first demodulation constellation corresponding to a $k^{th}$ bit among m number of bits, wherein k is an even number greater than zero and equal to or less than m;
determining arrangement of second demodulation constellation corresponding to an $n^{th}$ bit among the m number of bits, wherein n is an odd number less than m; and
demodulating the received modulation signal using the first and second demodulation constellations,
wherein the first demodulation constellation arrangement has a pattern that repeats a square matrix ($M_k$) having a size of $2^{(m/2+1)-(k/2)}$.

2. The method of claim 1, wherein the square matrix ($M_k$) satisfies a following equation except for a biggest even number bit equal to or less than the m:

$$M_{k+2} = M_k \otimes \begin{bmatrix} 1 & 1 \\ 1 & 1 \end{bmatrix}.$$  [Equation A]

3. The method of claim 1, wherein the demodulating comprises remapping the received modulation signal to bits except a biggest even number bit equal to or less than the m among the $k^{th}$ bit using equation described in the following:

$y'_I = y_I - \lceil y_I/z \rceil \times z$ $y'_Q = y_Q - \lceil y_Q/z \rceil \times z$  [Equation B]

where, $y_I$ corresponds to a real number part of the received modulation signal, $y'_I$ corresponds to a real number part of a remapped signal, $y_Q$ corresponds to an imaginary number part of the received modulation signal, $y'_Q$ corresponds to an imaginary number part of a remapped signal, and z corresponds to the size of the square matrix.

4. The method of claim 1, wherein the demodulating comprises determining a sign for bits except a biggest even number bit equal to or less than the m among the $k^{th}$ bit using equation described in the following:

$(-1)^{\lceil y''_I/(z/2) \rceil + \lceil y''_Q/(z/2) \rceil}$, if $y_I < 0$, the $y''_I = -y_I$  [Equation C]

, if $y_Q < 0$, the $y''_Q = -y_Q$ where, $y_I$ corresponds to a real number part of the received modulation signal, $y_Q$ corresponds to an imaginary number part of the received modulation signal, and z corresponds to the size of the square matrix.

5. The method of claim 1, wherein the demodulating comprises performing remapping on a biggest even number bit equal to or less than the m among the $k^{th}$ bit using equation described in the following:

$y'_I = |y_I| - \lceil |y_I|/z \rceil \times z$ $y'_Q = |y_Q| - \lceil |y_Q|/z \rceil \times z$  [Equation D]

where, $y_I$ corresponds to a real number part of the received modulation signal, $y'_I$ corresponds to a real number part of a remapped signal, $y_Q$ corresponds to an imaginary number part of the received modulation signal, $y'_Q$ corresponds to an imaginary number part of a remapped signal, and z corresponds to the size of the square matrix.

6. The method of claim 1, wherein the demodulating comprises determining a sign for a biggest even number bit equal to or less than the m among the $k^{th}$ bit using equation described in the following:

$(-1)^{\lceil (y_I + 2^{m/2})/2 \rceil + \lceil (y_Q + 2^{m/2})/2 \rceil + 1}$  [Equation E]

where, $y_I$ corresponds to a real number part of the received modulation signal and $y_Q$ corresponds to an imaginary number part of the received modulation signal.

7. The method of claim 1, wherein the demodulating comprises performing remapping on a biggest odd number bit less than the m among the $n^{th}$ bit using equation described in the following:

$y'_Q = |y_Q| - \lceil |y_Q|/z \rceil \times z$  [Equation F]

where, $y_Q$ corresponds to an imaginary number part of the received modulation signal, $y'_Q$ corresponds to an imaginary number part of a remapped signal, and z corresponds to the size of the square matrix.

8. The method of claim 1, wherein the demodulating comprises determining a sign for a biggest odd number bit less than the m among the $n^{th}$ bit using equation described in the following:

$(-1)^{\lceil (y_Q + 2^{m/2})/z \rceil}$  [Equation G]

where, $y_Q$ corresponds to an imaginary number part of the received modulation signal and z corresponds to the size of the square matrix.

9. A user equipment demodulating a signal in a wireless access system, the user equipment comprising:
a radio frequency (RF) unit; and
a processor,
wherein the processor is configured to:
receive a modulation signal having a modulation order of $2^m$, wherein m is an even number greater than zero,
determine arrangement of first demodulation constellation corresponding to a $k^{th}$ bit among m number of bits, wherein k is an even number greater than zero and equal to or less than m,
determine arrangement of second demodulation constellation corresponding to an $n^{th}$ bit among the m number of bits, wherein n is an odd number less than m, and
demodulate the received modulation signal using the first and second demodulation constellations,
wherein the first demodulation constellation arrangement has a pattern that repeats a square matrix ($M_k$) having a size of $2^{(m/2+1)-(k/2)}$.

10. The user equipment of claim 9, wherein the square matrix ($M_k$) satisfies a following equation except for a biggest even number bit equal to or less than the m:

$$M_{k+2} = M_k \otimes \begin{bmatrix} 1 & 1 \\ 1 & 1 \end{bmatrix}.$$  [Equation A]

11. The user equipment of claim 9, wherein the processor is configured to remap the received modulation signal to bits except a biggest even number bit equal to or less than the m among the $k^{th}$ bit using equation described in the following:

$y'_I = y_I - \lceil y_I/z \rceil \times z$ $y'_Q = y_Q - \lceil y_Q/z \rceil \times z$  [Equation B]

where, $y_I$ corresponds to a real number part of the received modulation signal, $y'_I$ corresponds to a real number part of a remapped signal, $y_Q$ corresponds to an imaginary number part of the received modulation signal, $y'_Q$ corresponds to an imaginary number part of a remapped signal, and z corresponds to the size of the square matrix.

12. The user equipment of claim 9, wherein the processor is configured to determine a sign for bits except a biggest even number bit equal to or less than the m among the $k^{th}$ bit using equation described in the following:

$(-1)^{\lceil y''_I/(z/2) \rceil + \lceil y''_Q/(z/2) \rceil}$, if $y_I < 0$, the $y''_I = -y_I$  [Equation C]

, if $y_Q < 0$, the $y''_Q = -y_Q$ where, $y_I$ corresponds to a real number part of the received modulation signal, $y_Q$ corresponds to an imaginary number part of the received modulation signal, and z corresponds to the size of the square matrix.

13. The user equipment of claim 9, wherein the processor is configured to perform remapping on a biggest even number bit equal to or less than the m among the $k^{th}$ bit using equation described in the following:

$$y'_I = |y_I| - \lceil |y_I|/z \rceil \times z$$

$$y'_Q = |y_Q| - \lceil |y_Q|/z \rceil \times z \qquad \text{[Equation D]}$$

where, $y_I$ corresponds to a real number part of the received modulation signal, $y'_I$ corresponds to a real number part of a remapped signal, $y_Q$ corresponds to an imaginary number part of the received modulation signal, $y'_Q$ corresponds to an imaginary number part of a remapped signal, and z corresponds to the size of the square matrix.

14. The user equipment of claim 9, wherein the processor is configured to determine a sign for a biggest even number bit equal to or less than the m among the $k^{th}$ bit using equation described in the following:

$$(-1)^{\lceil (y_I + 2^{m/2})/2 \rceil + \lceil (y_Q + 2^{m/2})/2 \rceil + 1} \qquad \text{[Equation E]}$$

where, $y_I$ corresponds to a real number part of the received modulation signal and $y_Q$ corresponds to an imaginary number part of the received modulation signal.

15. The user equipment of claim 9, wherein the processor is configured to perform remapping on a biggest odd number bit less than the m among the $n^{th}$ bit using equation described in the following:

$$y'_Q = |y_Q| - \lceil |y_Q|/z \rceil \times z \qquad \text{[Equation F]}$$

where, $y_Q$ corresponds to an imaginary number part of the received modulation signal, $y'_Q$ corresponds to an imaginary number part of a remapped signal, and z corresponds to the size of the square matrix.

16. The user equipment of claim 9, wherein the processor is configured to determine a sign for a biggest odd number bit less than the m among the $n^{th}$ bit using equation described in the following:

$$(-1)^{\lceil (y_Q + 2^{m/2})/z \rceil} \qquad \text{[Equation G]}$$

where, $y_Q$ corresponds to an imaginary number part of the received modulation signal and z corresponds to the size of the square matrix.

* * * * *